US008446869B2

(12) United States Patent
Lee et al.

(10) Patent No.: US 8,446,869 B2
(45) Date of Patent: May 21, 2013

(54) APPARATUS AND METHOD FOR TRANSMITTING SYSTEM INFORMATION BLOCK IN A BROADBAND WIRELESS COMMUNICATION SYSTEM

(75) Inventors: Ju-Mi Lee, Seoul (KR); Yung-Soo Kim, Seongnam-si (KR); Joon-Young Cho, Suwon-si (KR); Ju-Ho Lee, Suwon-si (KR); Jong-Hyung Kwun, Seoul (KR); Chan-Ho Min, Seoul (KR); Young-Hyun Jeon, Guri-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 427 days.

(21) Appl. No.: 12/798,824

(22) Filed: Apr. 12, 2010

(65) Prior Publication Data

US 2010/0260156 A1 Oct. 14, 2010

(30) Foreign Application Priority Data

| Apr. 13, 2009 | (KR) | 10-2009-0031998 |
| Apr. 27, 2009 | (KR) | 10-2009-0036689 |
| Jun. 3, 2009 | (KR) | 10-2009-0049210 |

(51) Int. Cl.
*H04W 4/00* (2009.01)

(52) U.S. Cl.
USPC .......................... 370/329; 370/252; 370/336

(58) Field of Classification Search .......... 370/280–281, 370/225–228, 252–253, 329–338, 350
See application file for complete search history.

(56) References Cited

U.S. PATENT DOCUMENTS

| 2009/0005099 A1 | 1/2009 | Jung et al. | |
| 2009/0082002 A1 | 3/2009 | Kim et al. | |
| 2010/0182903 A1* | 7/2010 | Palanki et al. | 370/225 |
| 2011/0007673 A1* | 1/2011 | Ahn et al. | 370/280 |
| 2011/0085457 A1* | 4/2011 | Chen et al. | 370/252 |

FOREIGN PATENT DOCUMENTS

| JP | 2008-283648 | 11/2008 |
| KR | 1020080045096 A | 5/2008 |
| KR | 1020090026877 | 3/2009 |

OTHER PUBLICATIONS

International Search Report dated Dec. 14, 2010 in connection with International Patent Application No. PCT/KR2010/002270.
Written Opinion of the International Searching Authority dated Dec. 14, 2010 in connection with International Patent Application No. PCT/KR2010/002270.

* cited by examiner

*Primary Examiner* — Ricky Ngo
*Assistant Examiner* — Iqbal Zaidi

(57) ABSTRACT

An operation method of the femto BS includes configuring a subframe set including at least two types of subframes among subframes having predefined different structures, and, if a duration of a subframe carrying the subframe set arrives, transmitting one of the subframes included in the subframe set according to predefined order. The subframes having the predefined different structures include a first type subframe including a synchronization signal and a Master Information Block (MIB), a second type subframe including the synchronization signal, a third type subframe including the synchronization signal and system information, a fourth type subframe including the synchronization signal, the MIB, and the system information, and a fifth type subframe including the system information.

29 Claims, 21 Drawing Sheets

APPARATUS AND METHOD FOR TRANSMITTING SYSTEM INFORMATION BLOCK IN A BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Apr. 13, 2009 and assigned Serial No. 10-2009-0031998, a Korean patent application filed in the Korean Intellectual Property Office on Apr. 27, 2009 and assigned Serial No. 10-2009-0036689 and a Korean patent application filed in the Korean Intellectual Property Office on Jun. 3, 2009 and assigned Serial No. 10-2009-0049210, the entire disclosures of which are hereby incorporated by reference.

TECHNICAL FIELD OF THE INVENTION

The present invention relates to a broadband wireless communication system. More particularly, the present invention relates to an apparatus and method for transmitting a System Information Block (SIB) in a broadband wireless communication system supporting a femtocell.

BACKGROUND OF THE INVENTION

In recent years, miniature indoor Base Stations (BSs) have attracted great attention for the sake of improvement of performance of wireless communication systems. The miniature indoor BS is a way for simultaneously resolving issues such as extension of a mobile communication network, improvement of a service quality, integration of an indoor network service, and the like. Thus, the development of the miniature indoor BS is now in progress by many developers, and standardization works necessary for this are also in progress even by standardization groups such as $3^{rd}$ Generation Partnership Project (3GPP), 3GPP2, Institute of Electrical and Electronics Engineers (IEEE) 802.16m, etc.

Miniature indoor BSs, which are commonly referred to as femtocells, can allow users to enjoy a seamless high-speed data service at a low price even indoors without replacement of communication equipments and separate manipulation by installing inexpensive BSs indoors. Particularly, because the miniature indoor BS can provide a user positioned in a service shadow area with a service of the same quality as if an outdoor BS was nearby, it can be said to be an attractive alternative to mobile communication service providers or users.

A femtocell and a macrocell may either operate at the same frequency or operate at different frequencies. In case where the femtocell and macrocell operate at the same frequency, if a Mobile Station (MS) being in communication with a macro BS moves and enters a femtocell area, the MS can receive a signal of the femtocell. Thus, the MS can perform a handover to the femtocell after comparing a receive power of the femtocell signal with a receive power of a macrocell signal and detecting the femtocell area. On the contrary, in case where the femtocell and the macrocell operate at different frequencies, the MS has to scan a signal of the femtocell in order to detect the signal of the femtocell and an area, after changing an operation frequency from the macrocell frequency to the femtocell frequency.

The femtocell can be installed in any position of the macrocell. Moreover, a lot of femtocells can be also installed. Thus, the MS should perform scanning at all available femtocell frequencies at all times even in any position within the macrocell. Inter-frequency scanning deteriorates communication performance of an MS, which is in a connected mode state of transmitting/receiving a signal with a macro BS. Also, the inter-frequency scanning causes an increase of power consumption of an MS, which is in an idle mode state of transmitting/receiving no signal. In addition, the femtocell may not permit an access of at least one specific MS. Accessible MSs are predefined for every femtocell. To be aware of possibility or impossibility of access to the femtocell, the MS should read an SIB of the femtocell and thus, has to secure sufficient scanning time. In case where the femtocell and the macrocell operate at different frequencies as above, there is a problem of deteriorating communication performance of an MS being in access to a macrocell and, simultaneously, causing an increase of power consumption of the MS. Further, in case where the macrocell and the femtocell not only use different frequencies but also use different Radio Access Technologies (RATs), the MS communication performance deterioration and power consumption problem gets more serious because the MS has to perform both the inter-frequency scanning and inter-RAT scanning. Thus, there is a need to propose an alternative for solving the above problems and facilitating detection of a femtocell and reception of an SIB of the femtocell.

SUMMARY OF THE INVENTION

To address the above-discussed deficiencies of the prior art, it is a primary aspect of the present invention to provide an apparatus and method for preventing a deterioration of system performance resulting from application of a femtocell in a broadband wireless communication system supporting a femtocell.

Another aspect of the present invention is to provide an apparatus and method for allowing an MS to receive system information of a femtocell irrespective of an operation frequency of a femto Base Station (BS) in a broadband wireless communication system supporting a femtocell.

A further aspect of the present invention is to provide an apparatus and method for transmitting system information of a femtocell with no synchronization with a macro BS in a broadband wireless communication system supporting a femtocell.

Yet another aspect of the present invention is to provide an apparatus and method for decreasing the blind detection operation carried out for recognition of a femto BS in a broadband wireless communication system supporting a femtocell.

Still another aspect of the present invention is to provide an apparatus and method for transmitting system information of a femtocell with the same performance as that of a case where a macro BS and a femto BS operate at the same frequency band in a broadband wireless communication system supporting a femtocell.

The above aspects are achieved by providing an apparatus and method for transmitting a system information block in a broadband wireless communication system.

According to one aspect of the present invention, an operation method of a femto BS in a broadband wireless communication system supporting a femtocell is provided. The method includes configuring a subframe set including at least two types of subframes among subframes having predefined different structures and, if a duration of a subframe carrying the subframe set arrives, transmitting one of the subframes included in the subframe set according to predefined order. The subframes having the predefined different structures include a first type subframe including a synchronization signal and a Master Information Block (MIB), a second type subframe including the synchronization signal, a third type subframe including the synchronization signal and system information, a fourth type subframe including the synchronization signal, the MIB, and the system information, and a fifth type subframe including the system information. The synchronization signal included in the subframe set is the same as a synchronization signal transmitted through an operation frequency band of the femtocell BS.

According to another aspect of the present invention, an operation method of a BS in a broadband wireless communication system is provided. The method includes configuring a subframe set including at least two types of subframes among subframes having predefined different structures, and, transmitting one of the subframes included in the subframe set according to predefined order over a period of a duration of five subframes. The subframes having the predefined different structures include a first type subframe including a synchronization signal and an MIB, a second type subframe including the synchronization signal, a third type subframe including the synchronization signal, the MIB, and reference signals, a fourth type subframe including the synchronization signal and the reference signals, and a fifth type subframe including system information.

According to a further aspect of the present invention, a femto BS apparatus in a broadband wireless communication system supporting a femtocell is provided. The apparatus includes a controller and a transmitter. The controller configures a subframe set including at least two types of subframes among subframes having predefined different structures. If a duration of a subframe carrying the subframe set arrives, the transmitter transmits one of the subframes included in the subframe set according to predefined order. The subframes having the predefined different structures include a first type subframe including a synchronization signal and an MIB, a second type subframe including the synchronization signal, a third type subframe including the synchronization signal and system information, a fourth type subframe including the synchronization signal, the MIB, and the system information, and a fifth type subframe including the system information. The synchronization signal included in the subframe set is the same as a synchronization signal transmitted through an operation frequency band of a femtocell BS.

According to a yet another aspect of the present invention, a BS apparatus in a broadband wireless communication system is provided. The apparatus includes a controller and a transmitter. The controller configures a subframe set including at least two types of subframes among subframes having predefined different structures. The transmitter transmits one of the subframes included in the subframe set according to predefined order over a period of a duration of five subframes. The subframes having the predefined different structures include a first type subframe including a synchronization signal and an MIB, a second type subframe including the synchronization signal, a third type subframe including the synchronization signal, the MIB, and reference signals, a fourth type subframe including the synchronization signal and the reference signals, and a fifth type subframe including system information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

A technique for preventing a deterioration of system performance resulting from application of a femtocell in a broadband wireless communication system supporting a femtocell according to the present invention is described below. Particularly, the present invention considers a wireless communication system in which Base Stations (BSs) transmit Down-Link (DL) signals in an Orthogonal Frequency Division Multiplexing (OFDM) scheme, and relates to System Information Block (SIB) transmission in a physical layer.

Figure 1:
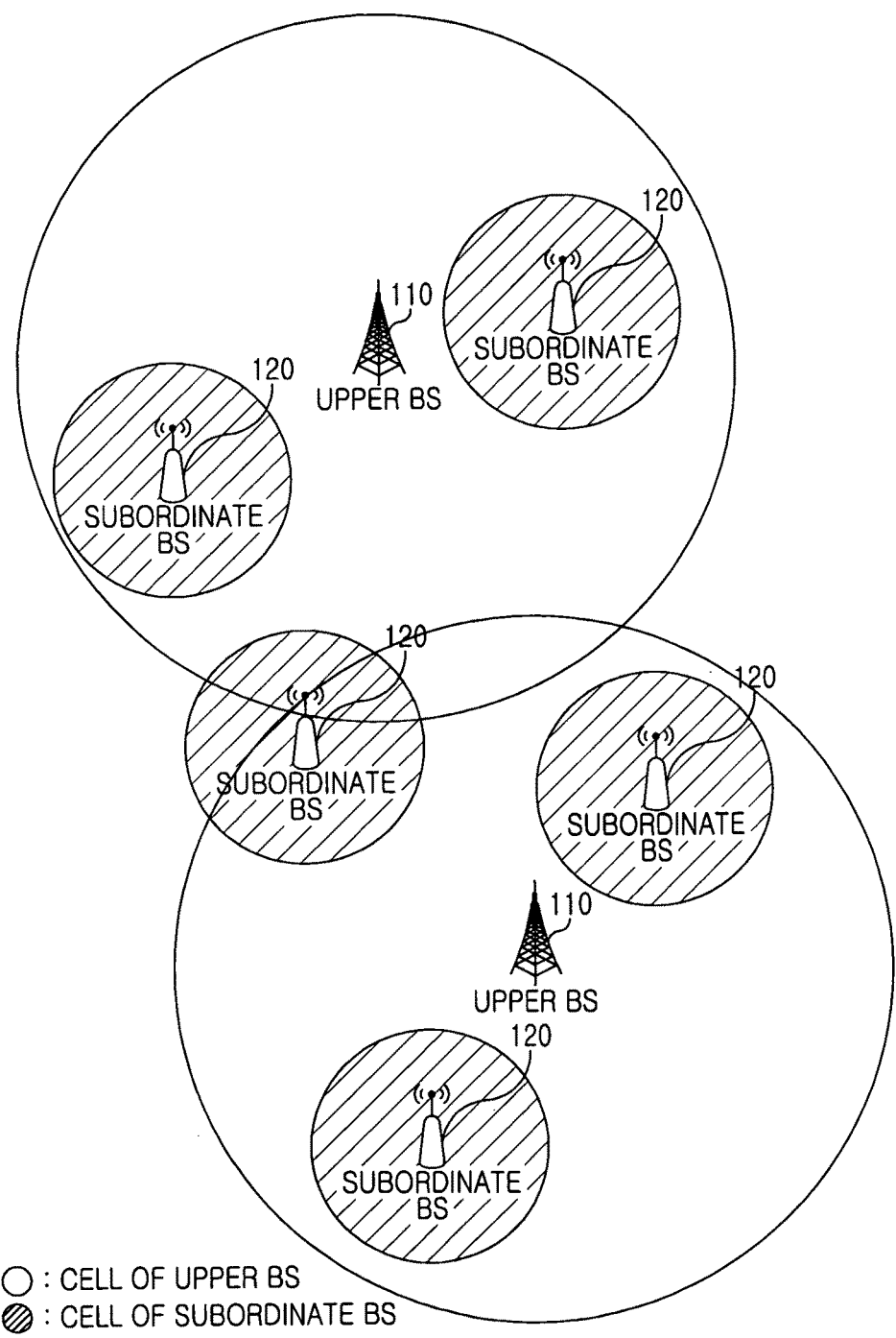
FIG. 1 illustrates a cell structure of a broadband wireless communication system considered in the present invention.

FIG. 1 illustrates a communication environment taken into consideration by the present invention. Referring to FIG. 1, there are two kinds of BSs, i.e., an upper BS 110 and a subordinate BS 120. The upper BS 110 and the subordinate BS 120 manage a cell of a different size. That is, the upper BS 110 has a relatively wide cell, and the subordinate BS 120 has a relatively narrow cell. Thus, the cell of the subordinate BS 120 is included in the cell of the upper BS 110 as illustrated in FIG. 1. For example, the subordinate BS 120 can be designated as a Home enhanced Node-B (HeNB), a femto BS, an indoor BS, etc., and the upper BS 110 can be designated as a macro enhanced Node-B (eNB), a macro BS, an outdoor BS, and so forth.

A system according to an exemplary embodiment of the present invention supports inbound mobility. The inbound mobility means a handover from the upper BS 110 to the subordinate BS 120. That is, a Mobile Station (MS) (i.e., a User Equipment (UE)) can perform a handover between the upper BSs 110, a handover between the subordinate BSs 120, or a handover between the upper BS 110 and the subordinate BS 120. For the sake of this, the MS has to receive system information of each of the upper BS 110 and the subordinate BS 120. At this time, because the cell of the subordinate BS 120 is included in the cell of the upper BS 110, system information transmission of the subordinate BS 120 is fulfilled according to a different scheme from a scheme, which is used in a system constituted of only cells of a single layer. Particularly, according to exemplary embodiments of the present invention described below, the subordinate BS 120 transmits the system information to an MS having access to the upper BS 110 and operating at a carrier frequency of the upper BS 110 such that the MS can receive the system information of the subordinate BS 120.

For the MS entering a service area of the subordinate BS 120 to detect the subordinate BS 120, the subordinate BS 120 periodically transmits an SIB to the MS through a DL carrier frequency used by the upper BS 110. Here, the SIB includes the system information of the subordinate BS 120. In the present invention below, the SIB of the subordinate BS 120 is denoted as 'SIB-InterWorking (SIB-IW)' or 'SIBx'. For example, the 'SIB-IW' or 'SIBx', which is the system information of the subordinate BS 120, includes at least one of parameters of Table 1 below.

TABLE 1

| Parameter | Content |
| --- | --- |
| plmn-IdntitList | PLMN (Public Land Mobile Network) identity list. The PLMN means one mobile communication service provider. |
| Cell Identity | Identity on cell of BS |
| CSG Idication | Indication representing if cell of BS transmitting SIBx is cell applying CSG (Closed Subscriber Group). |
| CSG Identity | Identity representing CSG mode. The CSG mode includes at least one of open mode, close mode, and hybrid mode. |
| RAT-indicator | Identity indicating Radio Access Technology (RAT) of BS transmitting SIBx. |
| hybrid-access-mode indicator | Identity indicating hybrid access mode of BS transmitting SIBx. |
| TDD-indicator | Identity distinguishing duplex schemes of BS transmitting SIBx. |
| dl-CarrierFreqInfo | DL operation frequency information of BS transmitting SIBx. |
| Low-duty-mode-Indicator | Identity representing current operation mode of BS transmitting SIBx. The operation mode is distinguished into first mode generally operating and second mode discontinuing partial function for power control. |
| ul-CarrierFreqInfo | UL operation frequency information of BS transmitting SIBx. Including only in case of operating in Frequency-Division Duplex (FDD). |
| SwitchingTimeInfo | DL/UL switching time information. Including only in case of operating in Time-Division Duplex (TDD). |
| RACH-preambleInfo | Preamble information necessary for random accessing BS transmitting SIBx. |

TABLE 1-continued

| Parameter | Content |
|---|---|
| SIBx_transmission_subframe_set_conf | Configuration information including period of transmission of subframe set, burst duration information, i.e., duty cycle of burst duration, information on whether current SIBx is $n^{th}$ subframe among subframe set (or among burst duration) or timing information at which next subframe set will be transmitted, SIBx contents change identifying counter, etc. |
| tracking area code | Code of tracking area to which BS transmitting SIBx belongs. The tracking area means a bundle of BSs used for call of MS. |

The SIBx is transmitted by a BS needing access control irrespective of whether the BS operates at an inter frequency or operates at an intra frequency. Particularly, in case where the BS operating at the inter frequency transmits the SIBx, the SIBx can additionally include a serving carrier frequency Information Element (IE) of the BS. For example, the serving carrier frequency IE means an inclusion of at least one of a serving carrier frequency of the BS transmitting the SIBx, a band size, a system frame number, and a frequency band indicator. Here, the frequency band indicator, which is an Identification (ID) number of a predefined frequency band, is to indicate if the frequency band is equal to, for example, 1.8 GHz, 2.5 GHz, and so forth.

Also, in case where an SIBx is transmitted by way of an inter RAT, a serving carrier frequency IE of the BS and a RAT indicator have to be additionally transmitted. That the serving carrier frequency IE is not included in the SIBx represents that the BS transmitting the SIBx operates at a frequency at which the SIBx is transmitted. That the RAT indicator is not included in the SIBx represents that the BS transmitting the SIBx uses the same RAT as a macro BS operating at the frequency at which the SIBx is transmitted. That is, in case where the BS transmitting the SIBx operates at the intra frequency, the SIBx may not include the serving carrier frequency IE and the RAT indicator.

For example, in case where the upper BS 110 has a carrier frequency (f1) and the subordinate BS 120 has a carrier frequency (f2), the subordinate BS 120 periodically transmits SIB-IW including its own system information through the carrier frequency (f1) of the upper BS 110. If an MS entering a service area of the subordinate BS 120 successfully decodes the SIB-IW, the MS recognizes that it enters the service area of the subordinate BS 120. Thus, the MS can judge if it is possible to access the subordinate BS 120 using the system information included in the SIB-IW, and perform a handover to the subordinate BS 120.

In exemplary embodiments of the present invention described below, a way to transmit the SIB-IW can be identically applied to not only an inter-frequency scenario but also an intra-frequency scenario. Here, the inter-frequency scenario means an environment in which a subordinate BS operates at a frequency band other than an operation frequency of an upper BS, and the intra-frequency scenario means an environment in which the subordinate BS operates at the operation frequency of the upper BS. Also, in order to facilitate handover even when the subordinate BS and the upper BS use different RATs, the SIB-IW can include information on a RAT applied to a femtocell.

From the viewpoint of physical layer transmission, the SIB-IW can be transmitted according to one of two schemes: synchronous transmission scheme and asynchronous transmission scheme.

The synchronous transmission scheme is a scheme in which a subordinate BS transmits the SIB-IW in time and frequency synchronization with an upper BS. That is, the upper BS allocates the subordinate BS a time and frequency resource at which the SIB-IW will be transmitted, and provides allocation information on the resources to MSs. In the present invention below, 'SIB-IW configuration information' denotes scheduling information for transmission of the SIB-IW. At this time, the subordinate BS recognizes the allocation information as predefined, or receives the allocation information from the upper BS through a wired channel or a wireless channel. Thus, the subordinate BS transmits the SIB-IW through the allocated time and frequency resources. In addition, in case where the MSs are adjacent to the subordinate BS, the MSs receive the SIB-IW transmitted from the subordinate BS.

The asynchronous transmission scheme is a scheme in which the subordinate BS transmits the SIB-IW in no time synchronization with the upper BS. The subordinate BS periodically transmits the SIB-IW at an operation frequency of the upper BS and, moreover, transmits a synchronization signal along with the SIB-IW. Here, the synchronization signal means a physical signal, which is constituted of a predefined sequence for the sake of synchronization acquisition of an MS. In this case, the upper BS cannot be aware of when the subordinate BS transmits the SIB-IW, and even MSs are not in advance notified of when the subordinate BS transmits the SIB-IW. But, MSs being in communication with the upper BS can receive the SIB-IW after checking the existence of the SIB-IW signal using the synchronization signal received from the subordinate BS.

However, the asynchronous transmission scheme has the possibility of occurrence of interference. Therefore, in order to minimize interference resulting from the SIB-IW transmitted by the subordinate BS, the upper BS can coordinate a specific time and frequency resource such that the subordinate BS can transmit the SIB-IW. This case is included in the asynchronous transmission scheme because the subordinate BS does not acquire a time and frequency synchronization with the upper BS although a resource position at which the subordinate BS transmits the SIB-IW is defined.

The following description is made for a procedure in which an MS acquires the SIB-IW configuration information from an upper BS.

The following description is for a procedure of acquiring the SIB-IW configuration information in case where the SIB-IW is transmitted in an asynchronous scheme. Because it is the asynchronous scheme, the upper BS does not transmit the SIB-IW configuration information to an MS. Thus, the MS has to detect a synchronization signal of a subordinate BS so as to receive the SIB-IW. The synchronization signal is a signal having a predefined value transmitted through a Physical Synchronization Channel (PSCH). For example, the synchronization signal includes a Primary Synchronization Signal (PSS) and a Secondary Synchronization Signal (SSS).

A physical layer of the SIB-IW transmitted as above is designed through the following process. First, resource allocation is determined by frame type at which the SIB-IW will be transmitted. Next, a pilot pattern is determined according to the resource allocation type, and the number of Orthogonal Frequency Division Multiple Access (OFDMA) symbols usable for data transmission is determined. Also, because the SIB-IW has to have the same or at least similar coverage to another SIB transmitted by a subordinate BS, a Modulation and Coding Scheme (MCS) level is determined considering a transmit power of the subordinate BS. Also, a scrambling code is determined such that an MS can distinguish received SIB-IW by subordinate BS, and resource mapping and transmission layer mapping are determined such that a real data resource (i.e., tone) position can be taken within a physical resource block designed for the SIB-IW.

Figure 2A:
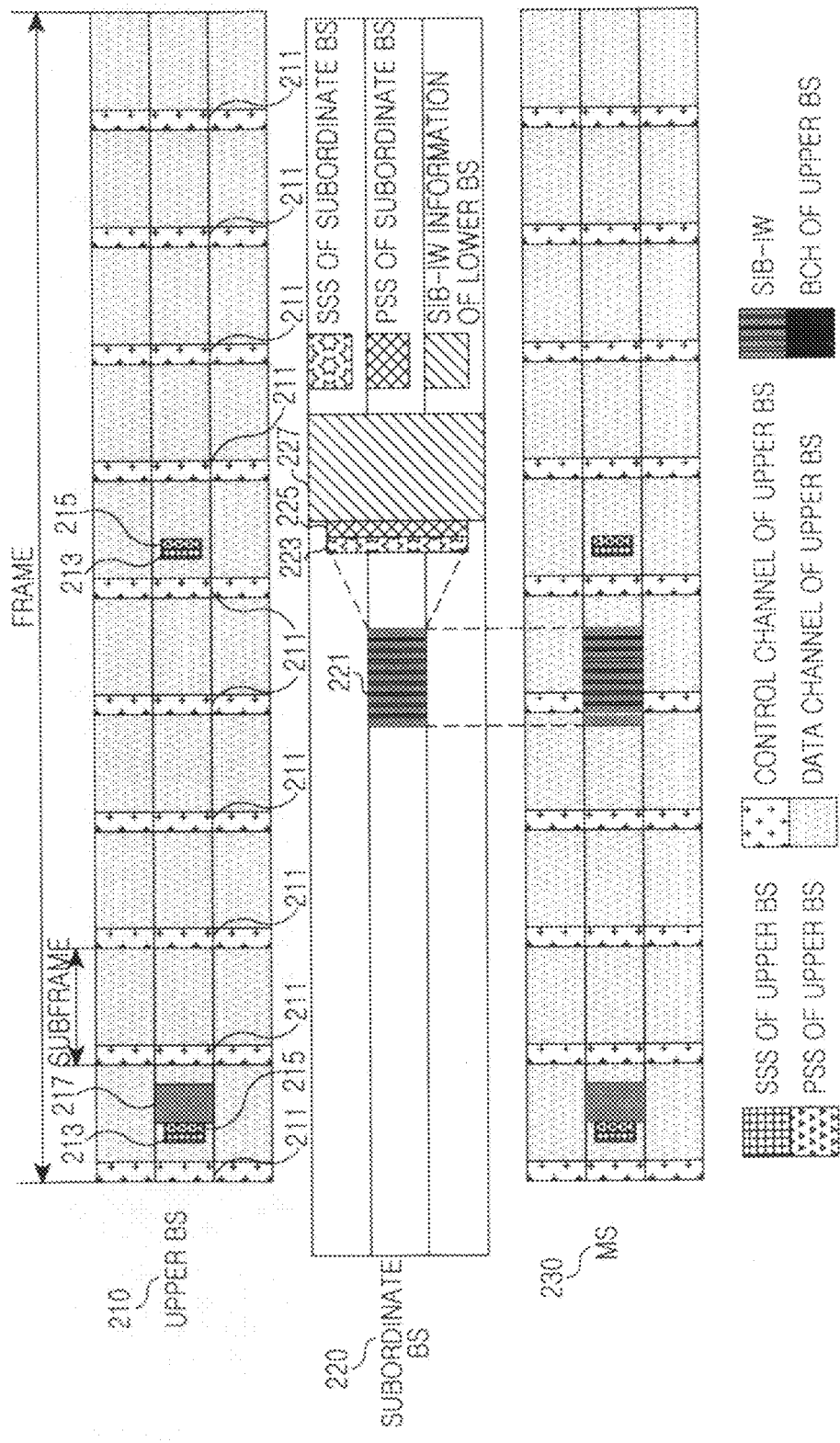
FIGS. 2A and 2B illustrate transmission of System Information Block-InterWorking (SIB-IW) according to an asynchronous scheme in a broadband wireless communication system according to an exemplary embodiment of the present invention.
Figure 2B:
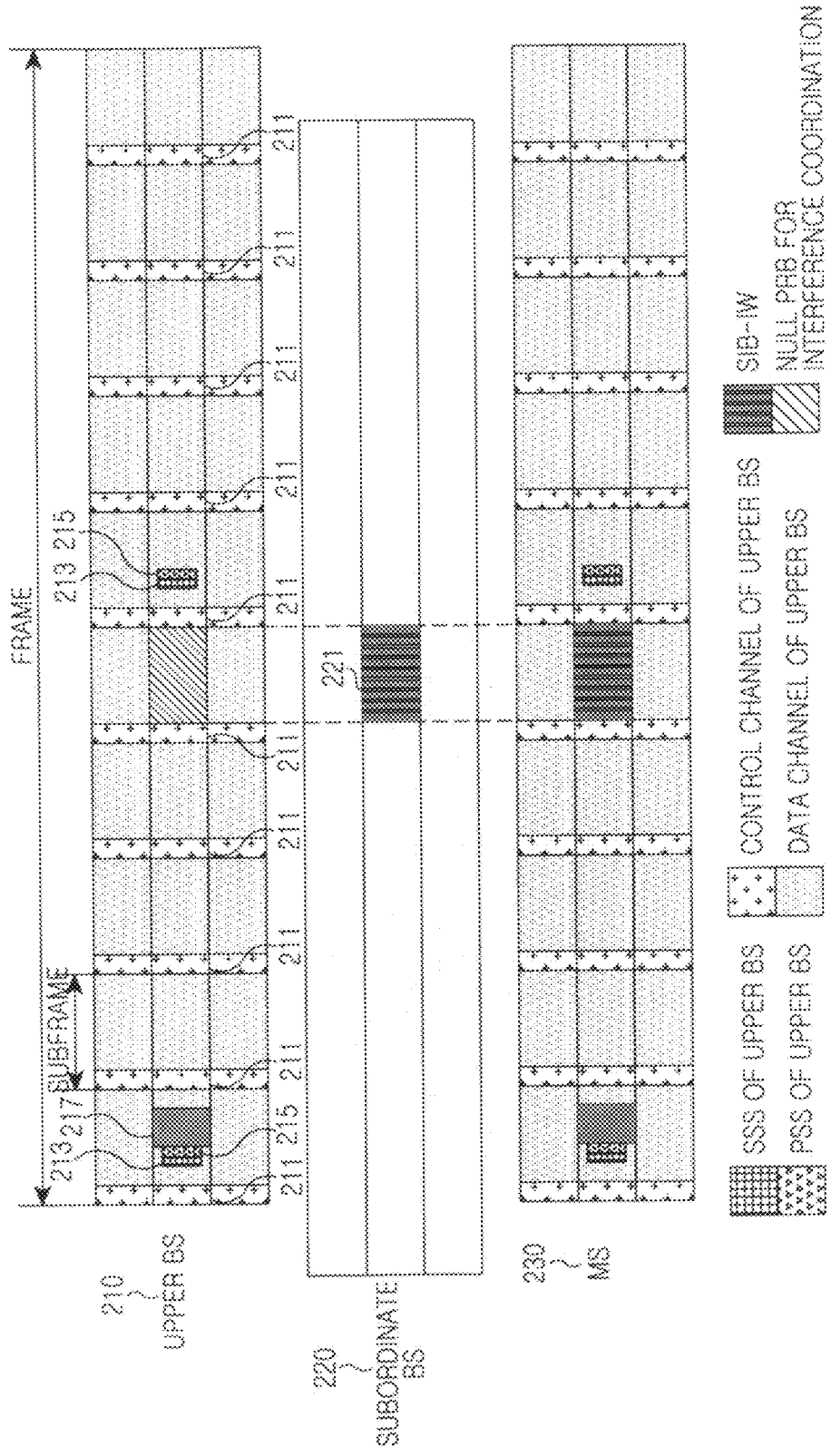

FIGS. 2A and 2B schematically illustrate transmission of SIB-IW according to an asynchronous scheme in a broadband wireless communication system according to an exemplary embodiment of the present invention. That is, FIG. 2 illustrates SIB-IW transmission in case where an upper BS and a subordinate BS are out of symbol synchronization.

Referring to FIGS. 2A and 2B, an upper BS 210 has a DL carrier frequency (f1), and a subordinate BS 220 has a frequency other than the 'f1'. The upper BS 210 transmits a control channel 211 including resource allocation information, every subframe. Here, the control channel 211 can be designated as a Physical Downlink Control Channel (PDCCH). In addition, through a first subframe, the upper BS 210 transmits a PSS 213 for time synchronization, an SSS 215 for frame synchronization, and a Master Information Block (MIB) 217 including system information. Through a fifth subframe, the upper BS 210 transmits reference signals 219 for channel estimation of MSs 230. Through a sixth subframe, the upper BS 210 transmits the PSS 213 and the SSS 215. At this time, the subordinate BS 220 periodically transmits SIB-IW 221 in no synchronization with the upper BS 210 through the DL carrier frequency (f1) of the upper BS 210. Here, it is desirable that resources for transmission of the SIB-IW 221 of the subordinate BS 210 are allocated focusing a center frequency of the upper BS 210 such that the MSs 230 can easily receive the SIB-IW 221 from the subordinate BS 220.

At this time, when the subordinate BS 220 transmit the SIB-IW 221 according to an asynchronous scheme, the upper BS 210 may perform or may not perform separate coordination for management of interference resulting from the SIB-IW 210. FIG. 2A illustrates a case of not managing the interference, and FIG. 2B illustrates a case of managing the interference.

Referring to FIG. 2A, in case where the upper BS 210 does not manage interference resulting from the SIB-IW 221 transmitted by the subordinate BS 220, the subordinate BS 220 transmits the SIB-IW 221, like a new intra-frequency BS, through the carrier frequency (f1) of the upper BS 210 according to a defined period. Due to this, the MSs 230 communicating with the upper BS 210 can judge the existence or absence of the subordinate BS 220 by separately demodulating and decoding the SIB-IW 221 received from the subordinate BS 220 through an intra frequency at the same time of receiving a signal transmitted by the upper BS 210.

Referring to FIG. 2B, in case where the upper BS 210 manages interference resulting from the SIB-IW 221 transmitted by the subordinate BS 220, the upper BS 210 reserves partial time and frequency resources for transmission of the SIB-IW 221 of the subordinate BS 220. The subordinate BS 220 acquires position information of the resources, which the upper BS 210 has reserved for the transmission of the SIB-IW 221, through an air interface or a backhaul, and transmits the SIB-IW 221 through a resource of a corresponding position. In this case, the subordinate BS 220 restricts only a resource position at which the SIB-IW 221 will be transmitted, and does not need to acquire a strict frequency and time synchronization with the upper BS 210. Thus, the MSs 230 receive the SIB-IW 221, which the subordinate BS 220 has transmitted according to the asynchronous scheme, in a previously reserved resource duration.

The subordinate BS 220 transmitting the SIB-IW 221 according to the asynchronous scheme has to provide its own synchronization signal to the MSs 230 such that the MSs 230 communicating with the upper BS 210 can receive the SIB-IW 221 from the subordinate BS 220. This is because, in view of a characteristic of an OFDM system, the MSs 230 cannot demodulate an OFDMA symbol with no synchronization. For the sake of this, the present invention proposes a way using the synchronization signal (i.e., PSS 213 and SSS 215) of the subordinate BS 220 as a synchronization signal for the SIB-IW 221, with no use of a separate synchronization signal. If using the synchronization signal 213 and 215 of the subordinate BS 220 for the asynchronous SIB-IW transmission, the MSs 230 can receive the synchronization signal for the SIB-IW 221 using a common cell search procedure as it is and, in addition to this, can naturally find out the synchronization signal (i.e., Physical layer Cell Identifier (PCI)) of the subordinate BS 220 having transmitted the SIB-IW 221. If using a cell search procedure of a $3^{rd}$ Generation Partnership Project Long Term Evolution (3GPPP LTE) Release 8 system as it is, the MSs 230 receives four symbols, which are transmitted in succession after the synchronization signal, as if the MSs 230 received an MIB of another cell operating at a corresponding carrier frequency. Thus, the SIB-IW 221 includes the synchronization signal 213 and 215 and SIB-IW information 227.

But, the MIB within the SIB-IW 221, namely, the SIB-IW information 227, asynchronously transmitted by the subordinate BS 220 has to be distinguished from MIBs normally transmitted by upper BSs operating at an intra frequency. So, the present invention proposes a way using a Cyclic Redundancy Check (CRC) mask as a way to distinguish a general MIB from the SIB-IW information 227. In case where the MSs 230 perform CRC mask checks of all possible combinations for MIB demodulation at all times by using the CRC mask to distinguish antenna ports through which MIBs are transmitted as in a 3GPP LTE Release 8 system, the MSs 230 can recognize that a decoded resource block is not the general MIB but the MIB including the SIB-IW 221, namely, the SIB-IW information 227, of the asynchronous scheme, if applying the MIB demodulation process of the MSs 230 and using a separate mask different from a CRC mask used for an existing MIB. Below, Tables 2 and 3 show examples of CRC masks, which are given for the SIB-IW 221 according to the asynchronous scheme. Table 2 shows a CRC mask pattern in case where the kind of the antenna port usable by the SIB-IW 221 according to the asynchronous scheme is one, and Table 3 shows a CRC mask pattern in case where the kind of the antenna port usable by the SIB-IW 221 according to the asynchronous scheme is two.

TABLE 2

| CRC mask | Case |
|---|---|
| <0, 0, 0, 0, 0, 0, 0, 0, 0, 0, 0, 0, 0, 0, 0, 0> | One antenna port of eNB |
| <1, 1, 1, 1, 1, 1, 1, 1, 1, 1, 1, 1, 1, 1, 1, 1> | Two antenna ports of eNB |

TABLE 2-continued

| CRC mask | Case |
| --- | --- |
| <0, 1, 0, 1, 0, 1, 0, 1, 0, 1, 0, 1, 0, 1, 0, 1> | Four antenna ports of eNB |
| <1, 0, 1, 0, 1, 0, 1, 0, 1, 0, 1, 0, 1, 0, 1, 0> | SIB-IW |

TABLE 3

| CRC mask | Case |
| --- | --- |
| <0, 0, 0, 0, 0, 0, 0, 0, 0, 0, 0, 0, 0, 0, 0, 0> | One antenna port of eNB |
| <1, 1, 1, 1, 1, 1, 1, 1, 1, 1, 1, 1, 1, 1, 1, 1> | Two antenna ports of eNB |
| <0, 1, 0, 1, 0, 1, 0, 1, 0, 1, 0, 1, 0, 1, 0, 1> | Four antenna ports of eNB |
| <1, 1, 1, 1, 0, 0, 0, 0, 1, 1, 1, 1, 0, 0, 0, 0> | SIB-IW/antenna port 1 |
| <0, 0, 0, 0, 1, 1, 1, 1, 0, 0, 0, 0, 1, 1, 1, 1> | SIB-IW/antenna port 2 |

FIGS. 2A and 2B illustrate schematic forms of the SIB-IW transmitted according to the asynchronous scheme. In FIGS. 2A and 2B, the SIB-IW is distinguished into the synchronization signal 213 and 215 and the SIB-IW information 217. The SIB-IW information 217 is just behind the synchronization signal 213 and 215 in succession on time axis. However, according to another exemplary embodiment of the present invention, a synchronization 213 and 215 and an SIB-IW information 217 signal may not be in succession on time axis. For example, the SIB-IW information 217 can be transmitted after the lapse of subframes of a predefined number or symbols of a predefined number from the synchronization signal 213 and 215.

Figures 3A, 3B:
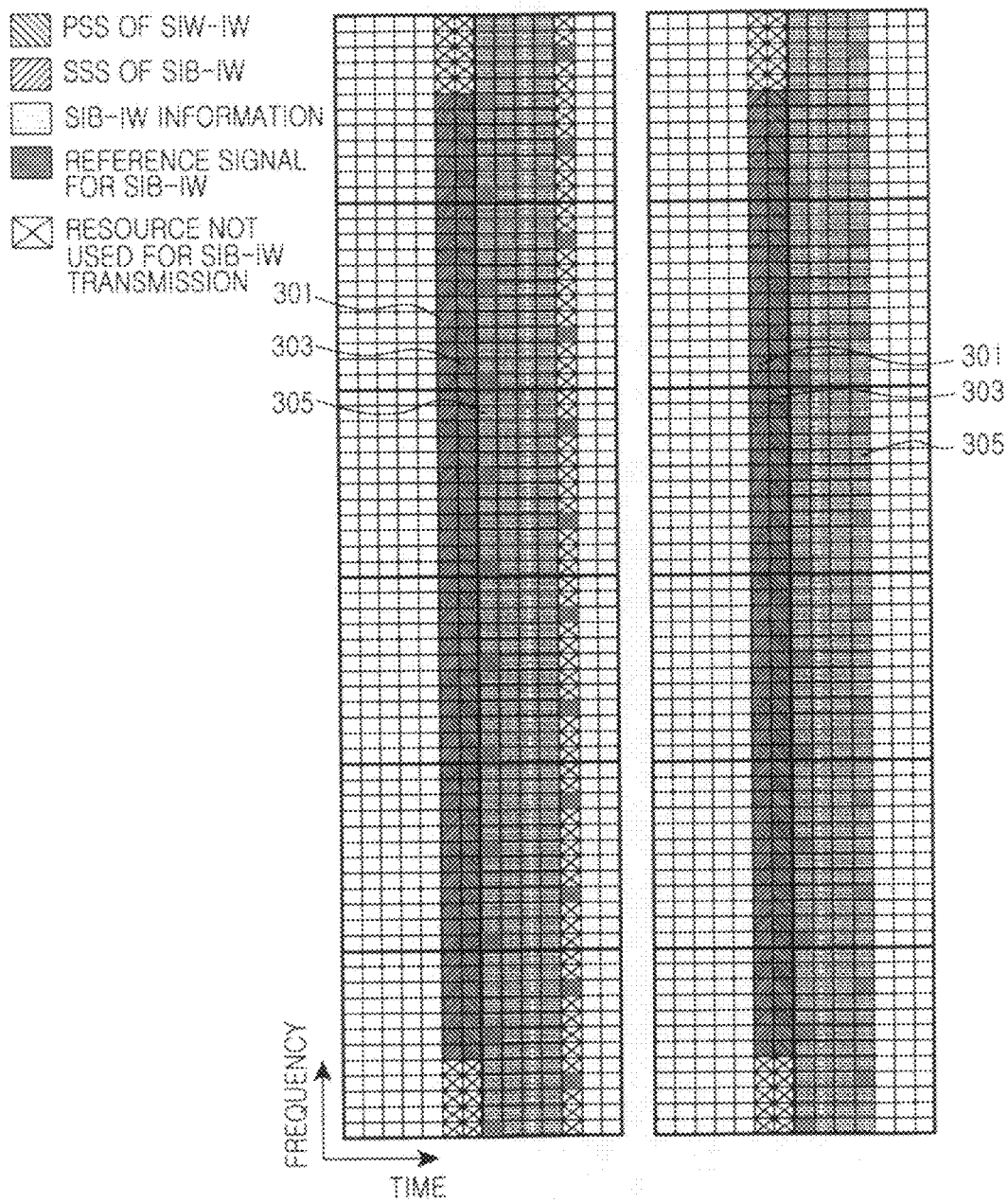
FIGS. 3A to 3D illustrate physical layer structures of SIB-IW transmitted according to an asynchronous scheme in a broadband wireless communication system according to an exemplary embodiment of the present invention.

FIGS. 3A and 3B illustrate physical layer structures of SIB-IW of an asynchronous scheme each using one antenna port and two antenna ports. At this time, Table 4 below shows examples of parameters necessary for transmitting the SIB-IW as in FIGS. 3A and 3B.

TABLE 4

| | |
| --- | --- |
| Scrambling code | $c_{init} = N_{ID}^{cell}$ |
| Modulation scheme | QPSK |
| Cell-specific reference signal | $c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$ |
| CRC length | CRC-16 |
| Channel encoding | Tail Biting convolutional coding, coding rate 1/3 |

In Table 4, the '$N_{ID}^{cell}$' represents a PCI of a subordinate BS, the '$n_s$' represents a slot number within a radio frame at which SIB-IW is transmitted, the '$N_{CP}$' is a variable being set as '1' in case where it is a general Cyclic Prefix (CP) and '0' in case where it is an extended CP, and the 'l' represents the number of OFDM symbols included in one slot.

In case where the subordinate BS transmits the SIB-IW according to the asynchronous scheme, the subordinate BS has to transmit reference signals such that an MS can decode the SIB-IW. Thus, as illustrated in FIG. 3A, the subordinate BS according to the exemplary embodiment of the present invention transmits the reference signals of the SIB-IW, which is transmitted in the asynchronous scheme, in accordance with a cell-specific reference signal pattern of an MIB used by an upper BS. However, the '$c_{init}$' for scrambling is determined with reference to the parameters of the subordinate BS transmitting the SIB-IW. Here, detailed positions and constructions of the reference signals are varied depending on the number of antenna ports used for SIB-IW transmission and the kind of CP.

FIG. 3A illustrates a case where a general CP is used and an antenna port is one in number. Referring to FIG. 3A, even after a symbol duration where SIB-IW information 305 is transmitted, reference signals transmitted exist near the SIB-IW information 305. Thus, in case of transmitting SIB-IW using the general CP, a 2-symbol duration for transmitting only the reference signals is additionally used in addition to a 4-symbol duration for transmitting the SIB-IW information 305, for an MS to have enough channel estimation performance when decoding asynchronous SIB-IW.

FIG. 3B illustrates a case where an extended CP is used and an antenna port is one in number. Referring to FIG. 3B, all reference signals exist within a symbol duration where SIB-IW information 305 is transmitted. Thus, in case of transmitting SIB-IW using the extended CP, after transmission of a synchronization signal 301 and 303 for the SIB-IW, the transmission of the SIB-IW is completed with only a 4-symbol duration for transmitting the SIB-IW information 305.

Figures 3C, 3D:
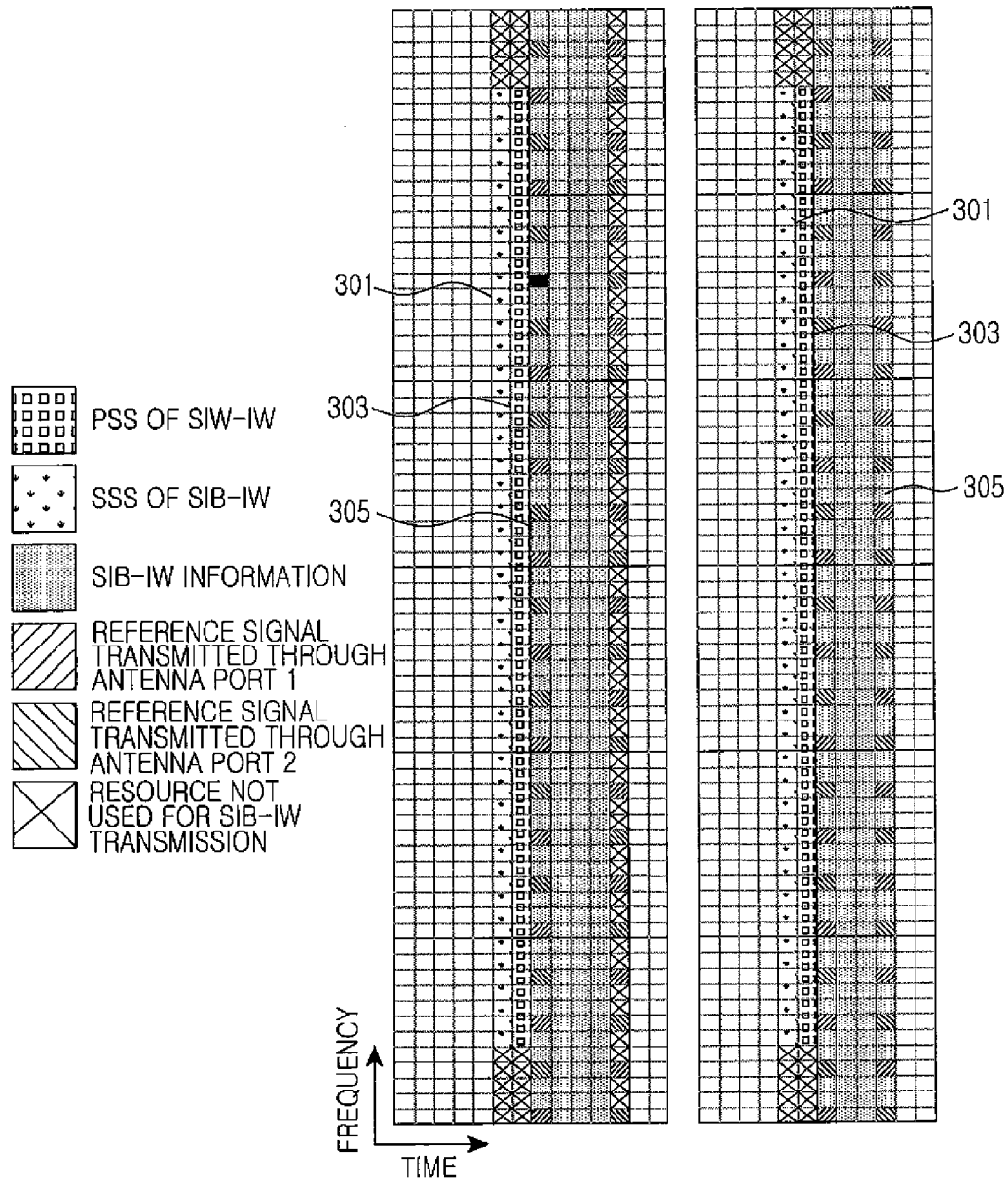

FIG. 3C illustrates a case where a general CP is used and an antenna port is two in number. In this case, when compared to FIG. 3A, a physical layer structure of SIB-IW includes a synchronization signal 301 and 303 of the same structure and SIB-IW information 305 but includes a double number of reference signals. At this time, the reference signals are divided and transmitted through two antennas according to a constant rule.

FIG. 3D illustrates a case where an extended CP is used and an antenna port is two in number. In this case, compared to FIG. 3B, a physical layer structure of SIB-IW includes a synchronization signal 301 and 303 of the same structure and SIB-IW information 305 but includes a double number of reference signals. At this time, the reference signals are divided and transmitted through two antennas in compliance with a constant rule.

Generally, in case where an MS searches a neighbor cell targeting a handover from an upper BS to a different upper BS, the MS judges handover or non-handover using a Received Signal Strength Indication (RSSI) of a reference signal of a corresponding upper BS, if a level of a received synchronization signal exceeds a constant reference value. However, in case of a handover to a subordinate BS, the aforementioned handover procedure cannot be applied. This is because, unlike the fact that the upper BS is identified with only a synchronization signal and a reference signal without reception of an SIB, the subordinate BS is not identified if it is an accessible node with only a synchronization signal. Moreover, if preamble sequences used in the synchronization signals of the upper BS and the subordinate BS are not distinguished, the MS cannot judge if a target node for handover is the upper BS or the subordinate BS. Thus, a system according to an exemplary embodiment of the present invention distinguishes the preamble sequence for the upper BS from the preamble sequence for the subordinate BS.

Thus, in case where a detected synchronization signal is a preamble sequence for a subordinate BS, an MS recognizes that a corresponding target node is the subordinate BS, and attempts to receive an SIB in order to be aware of accessibility or non-accessibility to the subordinate BS and identification information of the subordinate BS. After identifying the SIB of the subordinate BS, the MS judges the accessibility or non-accessibility to the subordinate BS and execution or non-execution of handover. That is, in order to judge possibility or impossibility of a handover to the subordinate BS, the MS receives only a subframe including at least one of a synchronization signal, an MIB, and an SIB. Thus, whether the subordinate BS transmits subframes including data has no influence on an operation of the MS, which judges the accessibility or non-accessibility to the subordinate BS and the possibility or impossibility of handover. That is, the subordinate BS performs communication at its own operation frequency band and, at the same time, periodically transmits only the subframe including at least one of the synchronization signal, the MIB, and the SIB at an operation frequency band of a macro BS and, by doing so, the subordinate BS can make the MS recognize that the subordinate BS operates at the operation frequency band of the macro BS.

At this time, like the SIB-IW, the SIB includes information for an access to the subordinate BS, information representing transmission scheduling of the SIB, and information for judging accessibility and non-accessibility. For example, in addition to 'CSG Identity' having to be transmitted in case where the subordinate BS is in a CSG mode, the SIB can additionally include 'dl-carrier freqInfo' that is operation frequency information of the subordinate BS and 'SIB-IW_transmission_subframe_set_conf' that is transmission scheduling information of a subframe including an SIB. Here, the 'SIB-IW_transmission_subframe_set_conf' can be configured in a form of an index representing one of a plurality of predefined transmission types. That is, the SIB, which has a different information construction from an SIB transmitted by the upper BS, is not a general SIB but a modified SIB similar to SIB-IW.

Figure 4A:
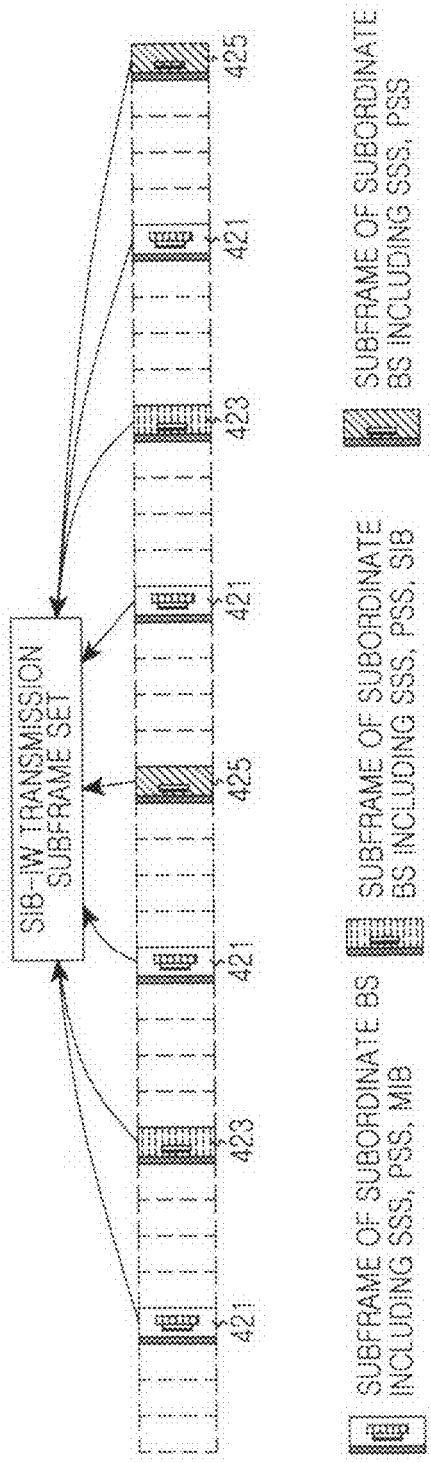
FIGS. 4A to 4C illustrate transmission of SIB-IW subframes according to an asynchronous scheme in a broadband wireless communication system according to an exemplary embodiment of the present invention.

FIG. 4A schematically illustrates transmission of an SIB-IW transmission subframe set according to an asynchronous scheme in a broadband wireless communication system according to an exemplary embodiment of the present invention.

Referring to FIG. 4A, a subordinate BS performs communication at its own operation frequency (f2). At the same time, at an operation frequency (f1) of an upper BS, the subordinate BS transmits a subframe 421 including a synchronization signal and an MIB through a third subframe duration of each frame and, alternately transmits a subframe 423 including the synchronization signal and an SIB and a subframe 425 including the synchronization signal through an eighth subframe duration of each frame. Here, the subframes transmitted by the subordinate BS at the operation frequency (f1) of the upper BS are called an 'SIB-IW transmission subframe set' in the present invention. At this time, a physical layer structure of the SIB-IW transmission subframe set is identical with a physical layer structure standard for signal transmission of the subordinate BS.

Thus, an MS receives the SIB-IW after sequentially detecting the synchronization signal and the MIB received from the subordinate BS. At this time, the MS cannot judge if the synchronization signal and the MIB are transmitted by the subordinate BS until the MS succeeds in detecting the synchronization signal and the MIB. Also, in case where the MS detects the synchronization signal but fails to detect the MIB, the MS again attempts to acquire an SIB-IW transmission subframe set of a corresponding subordinate BS by setting high priority to a preamble sequence constituting the synchronization signal.

While transmitting the SIB-IW transmission subframe set, the subordinate BS temporarily discontinues communication at its own operation frequency (f2). At this time, the communication is discontinued during one subframe duration or the communication is discontinued during two or more subframe durations depending on the duration of the time necessary for an operation of changing an operation frequency. For example, in case where the operation frequency (f1) of the upper BS and the operation frequency (f2) of the subordinate BS are included in different Frequency Allocation (FA), the time necessary for the operation frequency change can be relatively lengthened compared to a case where the operation frequencies (f1) and (f2) are included in the same FA. In this case, the communication can be discontinued during two or more subframe durations. But, in case where a transmitting means provided for the subordinate BS has the capability of simultaneously transmitting/receiving a signal at two operation frequency bands, the subordinate BS is not forced to discontinue the communication at its own operation frequency (f2) so as to transmit the SIB-IW transmission subframe set.

The above description referring to FIG. 4A is made for an exemplary embodiment of providing information for an access to a subordinate BS using an SIB. However, by including SIB-IW or SIBx in the SIB-IW transmission subframe set shown in FIG. 4A, a way to provide the information for the access to the subordinate BS through not the SIB but the SIB-IW or SIBx can be embodied as well. In other words, in order to support inbound mobility in a system according to the present invention, one of the following three ways can be applied.

First, a way to provide the information for the access to the subordinate BS through the SIB without using the SIBx or SIB-IW, Second, a way to promote easy reception of the SIBx or SIB-IW by providing scheduling information of the SIBx or SIB-IW through the SIB, and Third, a way using only the SIBx or SIB-IW.

Figure 4B:
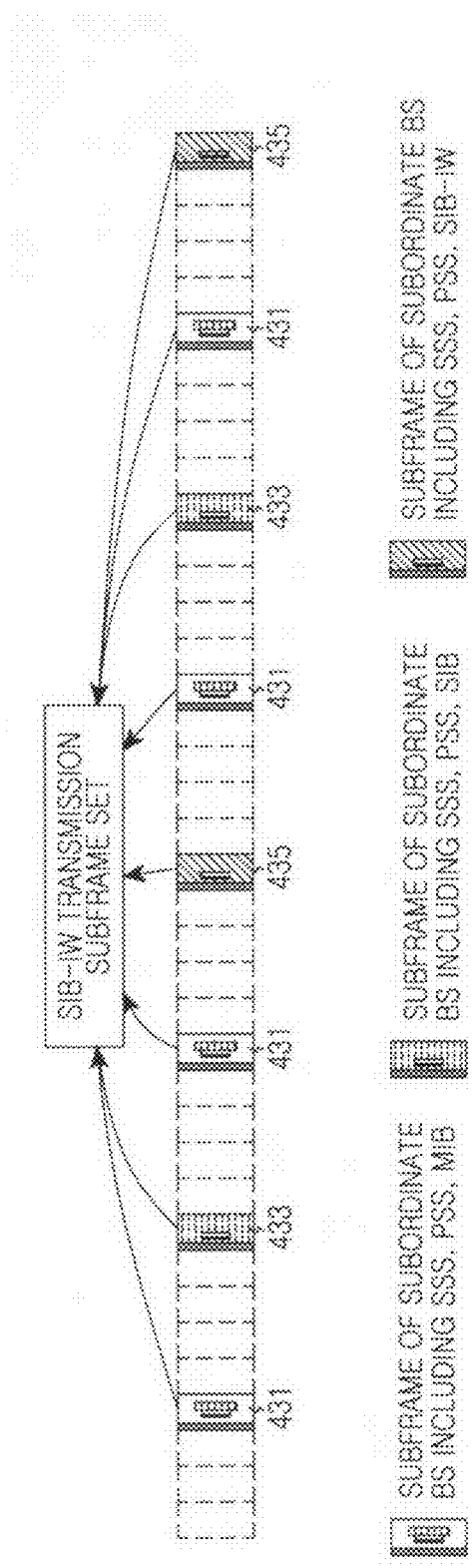

FIG. 4B schematically illustrates transmission of an SIB-IW transmission subframe set according to an asynchronous scheme in a broadband wireless communication system according to an exemplary embodiment of the present invention. FIG. 4B illustrates an exemplary embodiment of a case where SIB-IW is included in an SIB-IW transmission subframe set.

Referring to FIG. 4B, a subordinate BS performs communication at its own operation frequency (f2). At the same time, at an operation frequency (f1) of an upper BS, the subordinate BS transmits a subframe 431 including a synchronization signal and an MIB through a third subframe duration of each frame and, alternately transmits a subframe 433 including the synchronization signal and an SIB and a subframe 435 including the synchronization signal and SIB-IW through an eighth subframe duration of each frame. In addition, according to the intention of a licensee of the present invention, subframes other than the aforementioned form can be included in the SIB-IW transmission subframe set. For example, a subframe including the synchronization signal, the SIB, and the SIB-IW, a subframe including the synchronization signal, the MIB, and the SIB-IW, and a subframe including the SIB-IW can be included in the SIB-IW transmission subframe set. At this time, a physical layer structure of the SIB-IW transmission subframe set can be identical with a physical layer structure standard for signal transmission of the subordinate BS.

Here, the SIB includes scheduling information of the SIB-IW. Thus, after sequentially detecting the synchronization signal and the MIB received from the subordinate BS, an MS decodes the SIB, and receives the SIB-IW with reference to the scheduling information of the SIB-IW included in the SIB. At this time, the MS cannot judge if the synchronization signal and the MIB are transmitted by the subordinate BS until the MS succeeds in detecting the synchronization signal and the MIB. Also, in case where the MS detects the synchronization signal but fails to detect the MIB, the MS again attempts to acquire an SIB-IW transmission subframe set of a corresponding subordinate BS by setting high priority to a preamble sequence constituting the synchronization signal.

Figure 4C:
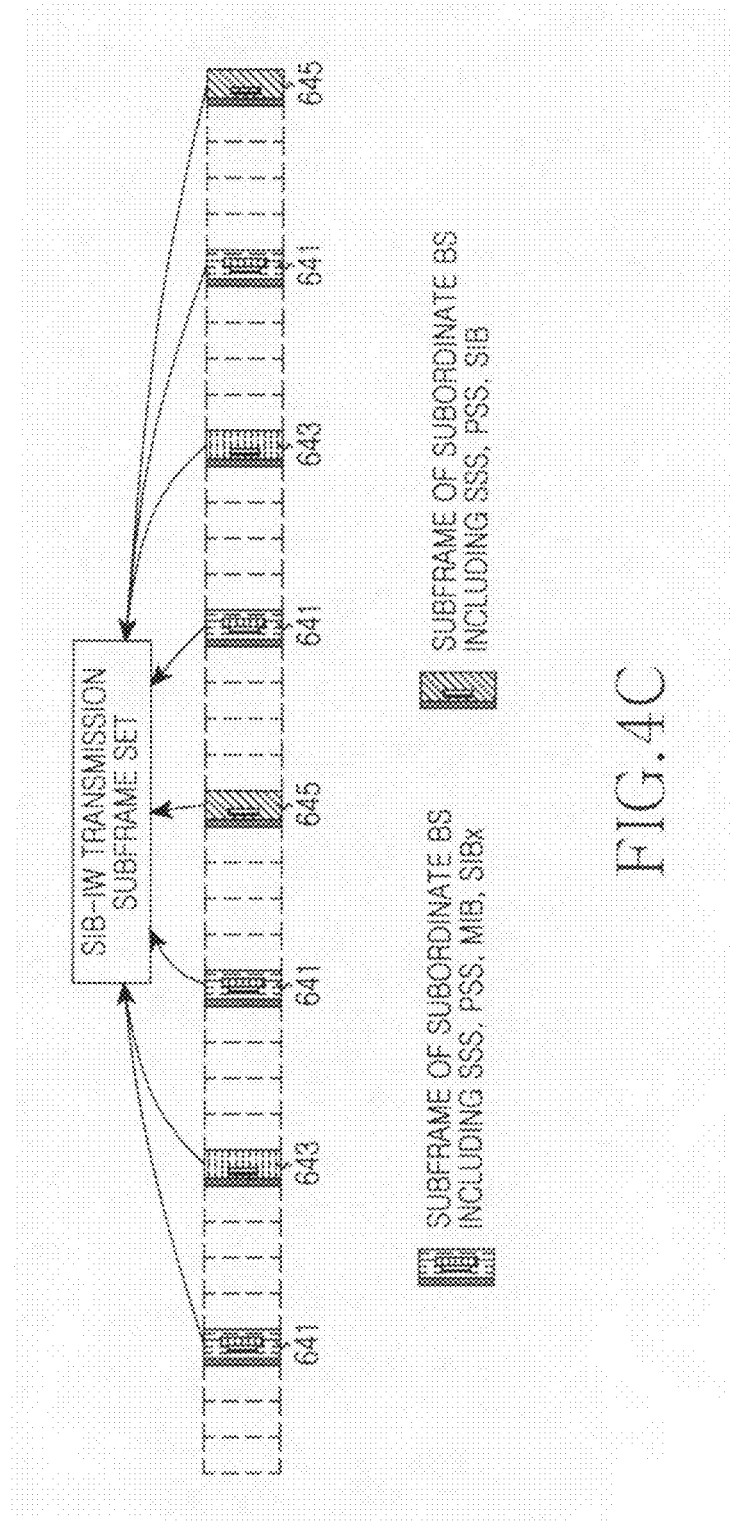

FIG. 4C schematically illustrates transmission of an SIB-IW transmission subframe set according to an asynchronous scheme in a broadband wireless communication system according to an exemplary embodiment of the present invention. FIG. 4C illustrates an exemplary embodiment of a case where an SIBx is included in an SIB-IW transmission subframe set.

Referring to FIG. 4C, a subordinate BS performs communication at its own operation frequency (f2). At the same time, at an operation frequency (f1) of an upper BS, the subordinate BS transmits a subframe 441 including a synchronization signal, an MIB, and an SIBx through a third subframe duration of each frame, and transmits a subframe 443 including the synchronization signal and an SIB through an eighth subframe duration of each frame. But, in case where the subordinate BS operates according to an intra-frequency scenario, the subordinate BS can transmit an SIB once per two frames through a sixth subframe duration. Or, even when operating according to an inter-frequency scenario, the subordinate BS can, according to need, transmit an SIB once per two frames through the sixth subframe duration. In addition, according to the intention of a licensee of the present invention, subframes other than the aforementioned form can be included in the SIB-IW transmission subframe set. For example, a subframe including the synchronization signal and the MIB, a subframe including the synchronization signal, and a subframe including the SIBx can be included in the SIB-IW transmission subframe set. At this time, a physical layer structure of the SIB-IW transmission subframe set can be identical with a physical layer structure standard for signal transmission of the subordinate BS.

Thus, an MS receives the SIBx after sequentially detecting the synchronization signal and the MIB received from the subordinate BS. At this time, the MS cannot judge if the synchronization signal and the MIB are transmitted by the subordinate BS until the MS succeeds in detecting the synchronization signal and the MIB. Also, in case where the MS detects the synchronization signal but fails to detect the MIB, the MS again attempts to acquire an SIB-IW transmission subframe set of a corresponding subordinate BS by setting high priority to a preamble sequence constituting the synchronization signal.

Operations and constructions of an upper BS, a subordinate BS, and an MS for transmitting/receiving SIB-IW according to an exemplary embodiment of the present invention are described below in detail with reference to the accompanying drawings.

In the following description, a first exemplary embodiment of the present invention is made for asynchronous transmission of SIB-IW accompanied by interference coordination, a second exemplary embodiment is made for asynchronous transmission of SIB-IW with no interference coordination, a third exemplary embodiment is made for asynchronous transmission of an SIB-IW transmission subframe set using an SIB, a fourth exemplary embodiment is made for asynchronous transmission of an SIB-IW transmission subframe set using an SIB and SIB-IW, and a fifth exemplary embodiment is made for asynchronous transmission of an SIB-IW transmission subframe set using an SIBx.

In the following description, an 'SIB-IW information signal' denotes a signal representing SIB-IW information in SIB-IW of a physical layer, an 'SIB-IW signal' denotes a set of signals for delivering SIB-IW including the SIB-IW information signal, the synchronization signal for SIB-IW detection, the reference signal, and so forth, an 'SIB-IW duration' denotes a time and frequency resource duration allocated for transmission of SIB-IW, and 'SIB-IW configuration information' denotes scheduling information for transmission of SIB-IW.

Figure 5:
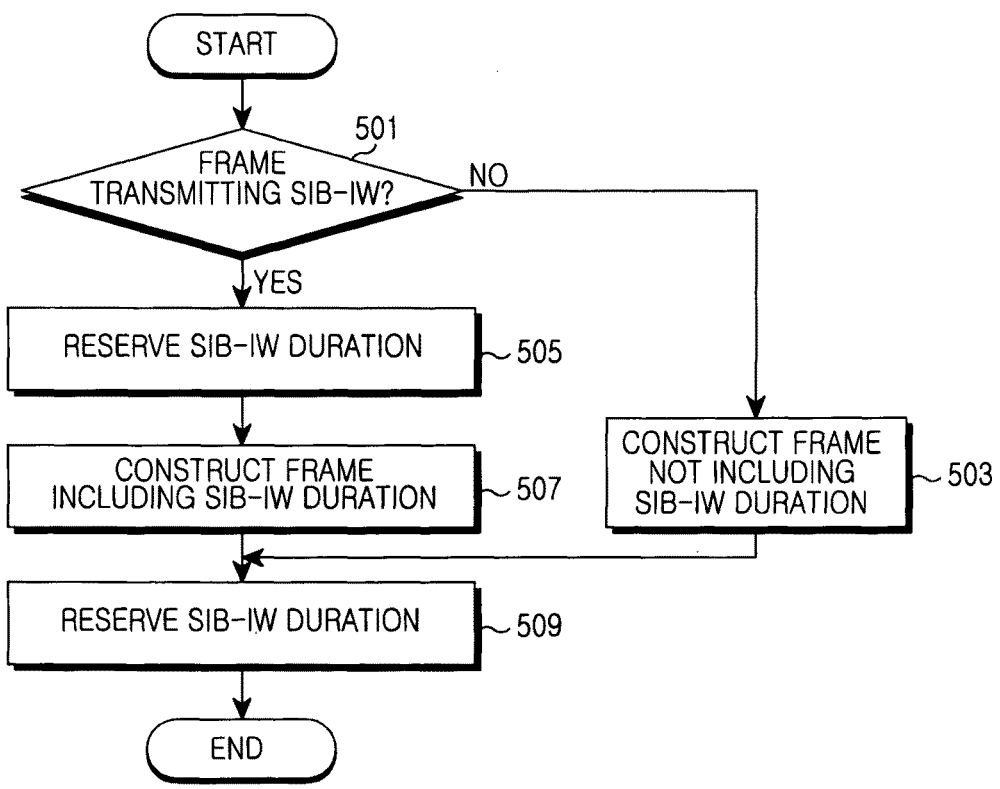
FIG. 5 illustrate an operation procedure of an upper Base Station (BS) (i.e., an enhanced Node-B (eNB)) in a broadband wireless communication system according to a first exemplary embodiment of the present invention.

FIG. 5 illustrates an operation procedure of an upper BS in a broadband wireless communication system according to a first exemplary embodiment of the present invention. FIG. 5 illustrates the operation procedure of the upper BS for transmitting SIB-IW according to an asynchronous scheme as in FIG. 2B.

Referring to FIG. 5, in step 501, the upper BS identifies if a current frame is a frame where the SIB-IW is transmitted. At this time, one or two or more SIB-IW can be transmitted by one or two or more subordinate BSs. That is, the upper BS identifies an SIB-IW transmission schedule determined according to given SIB-IW configuration information, and judges if a current frame is a frame where the SIB-IW is transmitted.

If the current frame is not the frame where the SIB-IW is transmitted, the upper BS proceeds to step 503 and constructs a frame not including an SIB-IW duration. More particularly, the upper BS performs an operation of a general BS of constructing a frame, which includes a plurality of subframes but includes a control channel at a front end of each subframe and includes a synchronization signal and an MIB at partial subframes, and so forth.

Alternatively, if the current frame is the frame where the SIB-IW is transmitted, the upper BS proceeds to step 505 and reserves the SIB-IW duration within the frame. During the SIB-IW duration, the upper BS transmits only a reference signal without transmitting a data signal. At this time, a position of the SIB-IW duration is identified by way of the SIB-IW configuration information, or is determined by way of judgment of the upper BS, or is determined by way of an upper network element.

Next, the upper BS proceeds to step 507 and constructs a frame including the SIB-IW duration. That is, the upper BS constructs a frame, which includes a plurality of subframes but includes a control channel at a front end of each subframe and includes a synchronization signal and an MIB at partial subframes, particularly, includes the SIB-IW duration.

Then, the upper BS proceeds to step 509 and transmits the frame constructed in step 503 or step 507. That is, the upper BS generates a DL signal according to the constructed frame, and transmits the DL signal to MSs within a cell.

Figure 6:
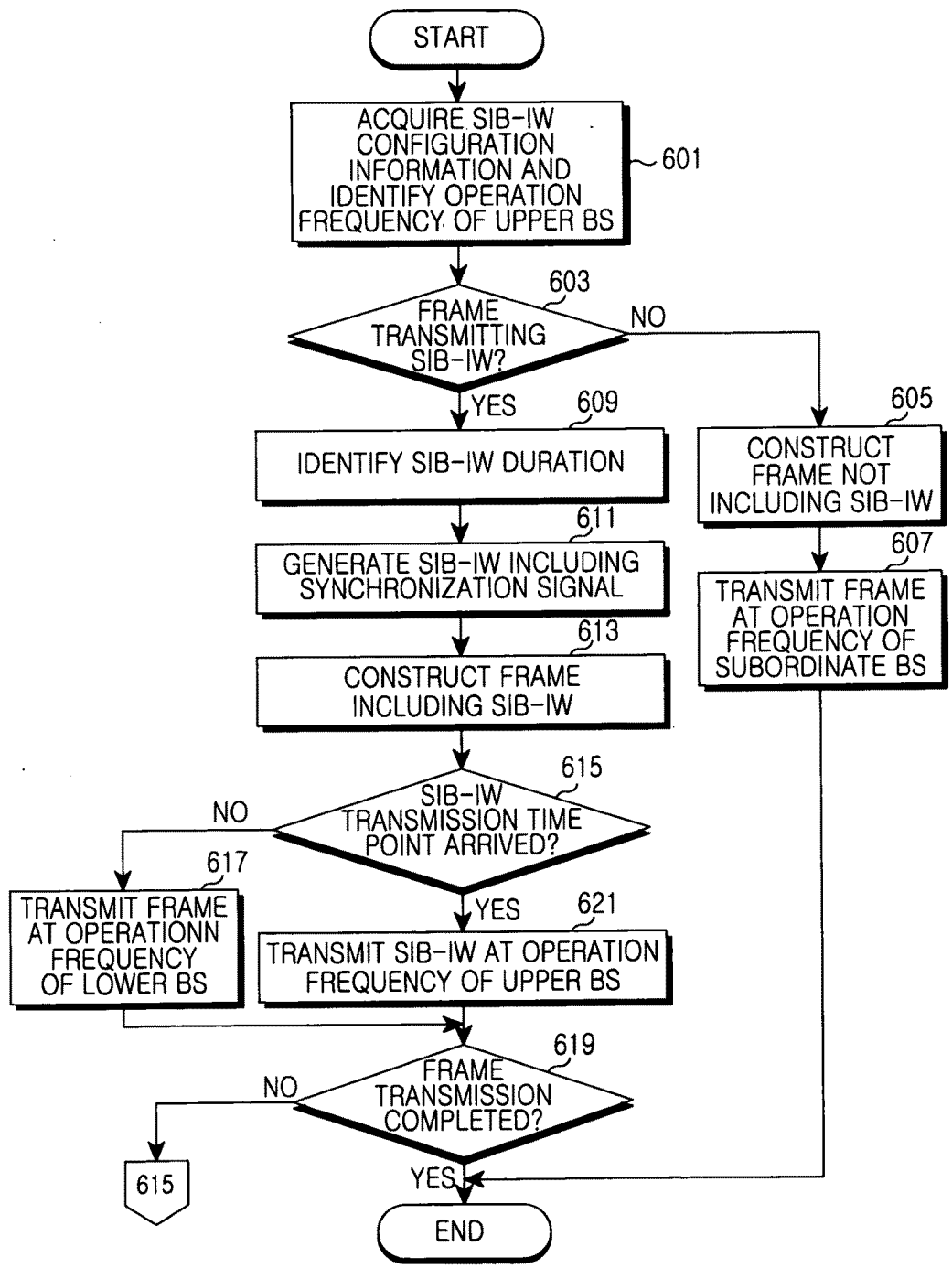
FIG. 6 illustrate an operation procedure of a subordinate BS (i.e., a Home enhanced Node-B (HeNB)) in a broadband wireless communication system according to a first exemplary embodiment of the present invention.

FIG. 6 illustrates an operation procedure of a subordinate BS in a broadband wireless communication system according to a first exemplary embodiment of the present invention. FIG. 6 illustrates the operation procedure of the subordinate BS for transmitting SIB-IW according to an asynchronous scheme as in FIG. 2B.

Referring to FIG. 6, in step 601, the subordinate BS acquires SIB-IW configuration information. Here, the SIB-IW configuration information is received through an SIB of an upper BS or is acquired through a backhaul network. Also, the subordinate BS identifies an operation frequency band of the upper BS. At this time, the subordinate BS identifies the operation frequency band of the upper BS by searching a wireless channel, or acquires operation frequency information of the upper BS through the backhaul network.

Then, the subordinate BS proceeds to step 603 and identifies if a current frame is a frame transmitting the SIB-IW. That is, the subordinate BS identifies an SIB-IW transmission schedule included in the SIB-IW configuration information acquired in step 601, and judges if the current frame is the frame where the SIB-IW is transmitted.

If the current frame is not the frame transmitting the SIB-IW, the subordinate BS proceeds to step 605 and constructs a frame not including the SIB-IW. For example, in case where the subordinate BS uses the same-structure frame as the upper BS, the subordinate BS constructs a frame, which includes a plurality of subframes but includes a control channel at a front end of each subframe and includes a synchronization signal and an MIB at partial subframes.

After constructing the frame not including the SIB-IW, the subordinate BS proceeds to step 607 and transmits the frame at an operation frequency of the subordinate BS. That is, the subordinate BS transmits DL signals to MSs located within its own cell. But, in case where no MS has access to the subordinate BS, or MSs do not perform communication although being in access to the subordinate BS, the subordinate BS does not perform steps 605 and 607 or transmits only an essential signal including a reference signal, and system information.

If the current frame is the frame transmitting the SIB-IW in step 603, the subordinate BS proceeds to step 609 and identifies an SIB-IW duration. That is, the subordinate BS identifies whether the subordinate BS has to transmit the SIB-IW through any time and frequency resource of the frame according to the SIB-IW transmission scheduling information.

After identifying the SIB-IW duration, the subordinate BS proceeds to step 611 and generates the SIB-IW including a synchronization signal. That is, the subordinate BS constructs a message including system information of the subordinate BS, converts the message into complex symbols through coding and modulation, and then performs scrambling. At this time, the subordinate BS applies predefined channel coding scheme, modulation scheme, and scrambling code for the sake of the SIB-IW. Additionally, the subordinate BS generates the synchronization signal for the SIB-IW. That is, the SIB-IW includes the synchronization signal and SIB-IW information. At this time, a synchronization signal of the subordinate BS can be used as the synchronization signal for the SIB-IW. In this case, the SIB-IW information has a structure of an MIB. Thus, in order to represent that the MIB as the SIB-IW information is for the SIB-IW, the subordinate BS applies a CRC mask representing the SIB-IW, to the MIB as the SIB-IW information. Here, the CRC mask can be varied depending on the number of antenna ports used to transmit the SIB-IW. For example, in case where the antenna port is one in number, the CRC mask representing the SIB-IW can be [1,0,1,0,1,0,1,0,1,0,1,0,1,0]. In case where the antenna port is two in number, the CRC mask representing the SIB-IW can be [1,1,1,1,0,0,0,0,1,1,1,1,0,0,0,0] and [0,0,0,0,1,1,1,1,0,0,0,0,1,1,1,1]. The CRC mask can change into various progression forms capable of distinguishing the antenna ports.

Then, the subordinate BS proceeds to step 613 and constructs a frame including the SIB-IW. For example, when the subordinate BS uses the same-structure frame as the upper BS, the subordinate BS constructs a frame, which includes a plurality of subframes but includes a control channel at a front end of each subframe and includes a synchronization signal and an MIB at partial subframes, particularly, includes the SIB-IW in a data channel. Here, the data channel can be designated as a Physical Downlink Shared CHannel (PDSCH). At this time, the SIB-IW is transmitted according to an asynchronous scheme and thus, the subordinate BS maps the SIB-IW signal without considering a reference signal of the upper BS. Also, the subordinate BS maps the SIB-IW and reference signals to the frame.

More particularly, in case where an antenna port is one in number and a general CP is applied, the subordinate BS maps the synchronization signal to two symbols and maps the SIB-IW information signal to four symbols following the two symbols but, at regular intervals, maps the reference signals to partial tones within a $1^{st}$ symbol and a next symbol of a $4^{th}$ symbol among the symbols having mapped the SIB-IW information signal. For example, the subordinate BS maps the reference signals to $6n^{th}$ tones of the $1^{st}$ symbol on frequency axis and $(6n-3)^{th}$ tones of the next symbol of the $4^{th}$ symbol on frequency axis. Here, the 'n' is a positive integer.

In case where the antenna port is one in number and an extended CP is applied, the subordinate BS maps the synchronization signal to two symbols and maps the SIB-IW information signal to four symbols following the two symbols but, at regular intervals, maps the reference signals to partial tones within $1^{st}$ and $4^{th}$ symbols among the symbols having mapped the SIB-IW information signal. For example, the subordinate BS maps the reference signals to $6n^{th}$ tones of the $1^{st}$ symbol on frequency axis and $(6n-3)^{th}$ tones of the $4^{th}$ symbol on frequency axis. Here, the 'n' is a positive integer.

In case where the antenna port is two in number and the general CP is applied, the subordinate BS maps the synchronization signal to two symbols and maps the SIB-IW information signal to four symbols following the two symbols but, at regular intervals, maps reference signals of each antenna to partial tones within a $1^{st}$ symbol and a next symbol of a $4^{th}$ symbol among the symbols having mapped the SIB-IW information signal. For example, the subordinate BS maps reference signals of a first antenna to $6n^{th}$ tones of the $1^{st}$ symbol on frequency axis and $(6n-3)^{th}$ tones of the next symbol of the $4^{th}$ symbol on frequency axis, and maps reference signals of a second antenna to $(6n-3)^{th}$ tones of the $1^{st}$ symbol on frequency axis and $6n^{th}$ tones of the next symbol of the $4^{th}$ symbol on frequency axis. Here, the 'n' is a positive integer.

In case where the antenna port is two in number and the extended CP is applied, the subordinate BS maps the synchronization signal to two symbols and maps the SIB-IW information signal to four symbols following the two symbols but, at regular intervals, maps reference signals of each antenna to partial tones within $1^{st}$ and $4^{th}$ symbols among the symbols having mapped the SIB-IW information signal. For example, the subordinate BS maps reference signals of a first antenna to $6n^{th}$ tones of the $1^{st}$ symbol on frequency axis and $(6n-3)^{th}$ tones of the $4^{th}$ symbol on frequency axis, and maps reference signals of a second antenna to $(6n-3)^{th}$ tones of the $1^{st}$ symbol on frequency axis and $6n^{th}$ tones of the $4^{th}$ symbol on frequency axis. Here, the 'n' is a positive integer.

But, according to another implementation of the present invention, the subordinate BS can map the synchronization signal and the SIB-IW information signal at intervals of subframes of a predefined number or symbols of a predefined number.

After constructing the frame including the SIB-IW in step 613, the subordinate BS proceeds to step 615 and identifies if a time point of transmission of the SIB-IW has arrived. That is, the subordinate BS identifies if the SIB-IW duration starts continuously at the same time of a start of transmission of the frame.

If the time point of transmission of the SIB-IW does not arrive, the subordinate BS proceeds to step 617 and transmits the frame at the operation frequency of the subordinate BS. That is, the subordinate BS transmits DL signals to MSs having access to the subordinate BS. But, in case where no MS has access to the subordinate BS, or MSs do not perform communication although being in access to the subordinate BS, the subordinate BS does not perform step 617.

Then, the subordinate BS proceeds to step 619 and identifies if the transmission of the frame has been completed. That is, the subordinate BS identifies if the transmission of the frame constructed in step 613 has been completed. If the transmission of the frame is completed, the subordinate BS terminates the procedure according to the exemplary embodiment of the present invention. If the transmission of the frame is not completed, the subordinate BS returns to step 615.

If the time point of transmission of the SIB-IW arrives in step 615, the subordinate BS proceeds to step 621 and transmits the SIB-IW at an operation frequency of the upper BS. That is, the subordinate BS changes an operation frequency into the operation frequency of the upper BS, converts the SIB-IW mapped on the frame into OFDMA symbols through Inverse Fast Fourier Transform (IFFT) operation and CP insertion, up-converts the OFDMA symbols into a Radio Frequency (RF) band signal, and transmits the RF band signal through an antenna. At this time, after being in symbol synchronization with the upper BS, the subordinate BS transmits the SIB-IW.

Figure 7:
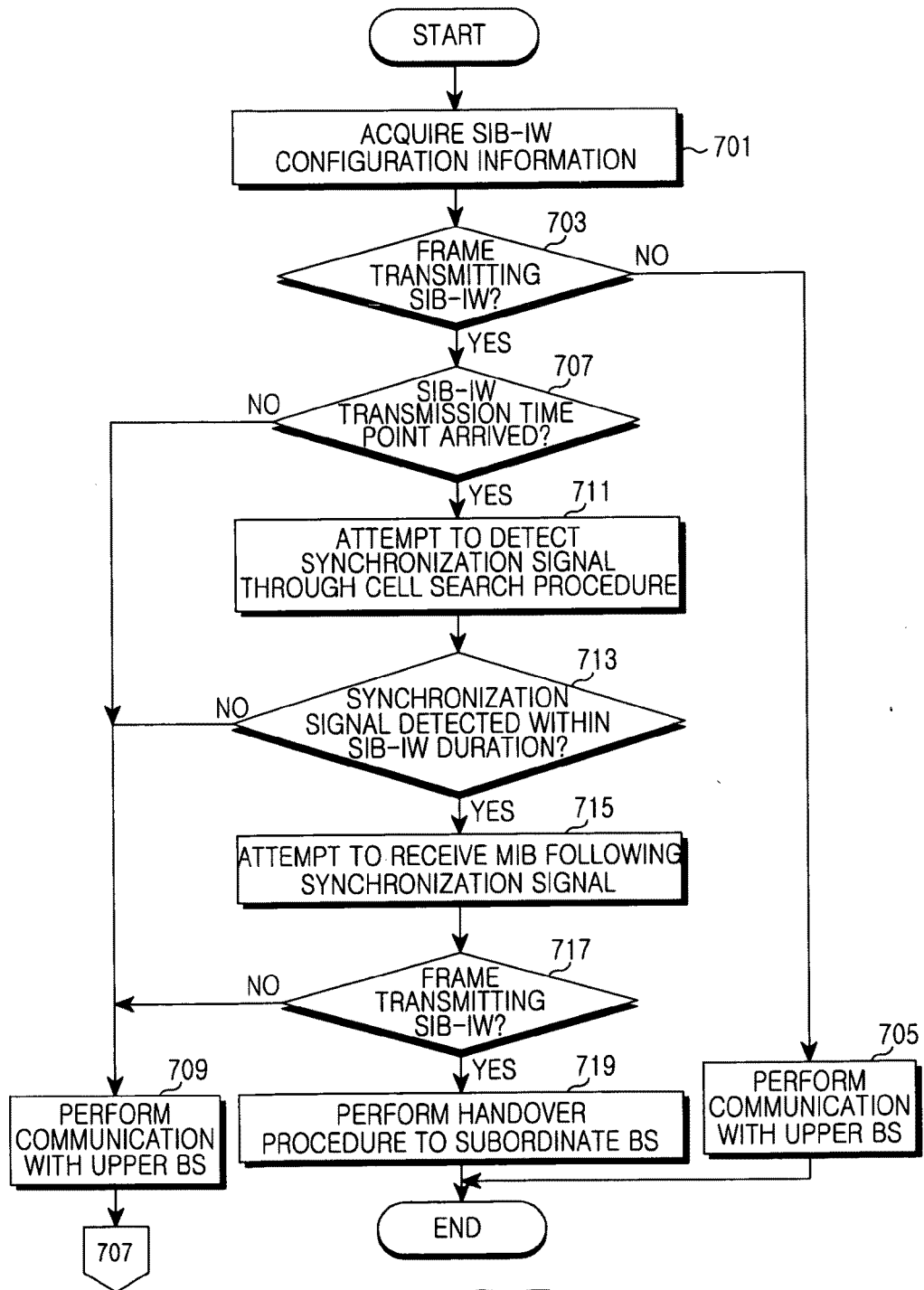
FIG. 7 illustrate an operation procedure of a Mobile Station (MS) (i.e., a User Equipment (UE)) in a broadband wireless communication system according to a first exemplary embodiment of the present invention.

FIG. 7 illustrates an operation procedure of an MS in a broadband wireless communication system according to a first exemplary embodiment of the present invention. FIG. 7 illustrates the operation procedure of the MS for, in case where SIB-IW is transmitted according to an asynchronous scheme as in FIG. 2B, receiving the SIB-IW.

Referring to FIG. 7, in step 701, the MS acquires SIB-IW configuration information. Here, the SIB-IW configuration information is received from an upper BS or an upper network element. For example, the SIB-IW configuration information is received through a broadcasting message, which includes an MIB of the upper BS.

Then, the MS proceeds to step 703 and identifies if a current frame is a frame where the SIB-IW is transmitted. At this time, one or two or more SIB-IW can be transmitted by one or two or more subordinate BSs. That is, the MS identifies an SIB-IW transmission schedule included in the SIB-IW configuration information acquired in step 701, and judges if the current frame is the frame where the SIB-IW is transmitted.

If the current frame is not the frame where the SIB-IW is transmitted, the MS proceeds to step 705 and performs communication with the upper BS. In other words, the MS performs the communication with the upper BS with no attempt to receive SIB-IW of a subordinate BS. That is, the MS identifies if there are resources allocated through a control channel at each subframe, and receives a DL signal through the allocated resources.

Alternatively, if the current frame is the frame where the SIB-IW is transmitted, the MS proceeds to step 707 and identifies if a time point of transmission of the SIB-IW has arrived. That is, the MS identifies if the SIB-IW duration starts continuously at the same time of a start of reception of the frame. Here, a time point of the start of the SIB-IW duration is identified through the SIB-IW configuration information.

If the SIB-IW transmission time point does not arrive in step 707, the MS proceeds to step 709 and performs communication with the upper BS. That is, the MS identifies if there are resources allocated through a control channel at each subframe, and receives a DL signal through the allocated resources. Thereafter, the MS returns to step 707.

Alternatively, if the SIB-IW duration arrives, the MS proceeds to step 711 and attempts to detect a synchronization signal of a BS other than a serving upper BS through a cell search procedure. Here, the cell search procedure is a background operation continuously carried out during an operation of the MS, and is for detecting a synchronization signal of an adjacent upper BS. Thus, the cell search procedure is continuously carried out irrespective of the progress of the procedure according to the exemplary embodiment of the present invention, and step 711 is for emphasizing the utilization of the cell search procedure in the procedure according to the exemplary embodiment of the present invention. Thus, in case where a synchronization signal for the SIB-IW has the same structure as the synchronization signal of the BS, the MS can detect the synchronization signal for the SIB-IW through the cell search procedure.

Then, the MS proceeds to step 713 and identifies if the synchronization signal is detected within the SIB-IW duration. If the synchronization signal is not detected within the SIB-IW duration, the MS recognizes that the MS cannot have access to the subordinate BS, and proceeds to step 709.

Alternatively, if the synchronization signal is detected within the SIB-IW duration, the MS proceeds to step 715 and attempts to receive an MIB following the synchronization signal. In other words, the MS attempts to demodulate and decode a signal received through the MIB following the synchronization signal. More particularly, the MS estimates a channel using signals received through tones for a reference signal among tones within symbols following the synchronization signal, and attempts to demodulate and decode signals received through data tones using the estimated channel.

After attempting to receive the MIB, the MS proceeds to step 717 and identifies if the MIB is an MIB as SIB-IW. At this time, whether the MIB is the SIB-IW is judged through a CRC mask. Thus, the MS performs a CRC check for a bit stream restored from the signal received through the MIB, using the CRC mask representing the SIB-IW and then, the MS judges reception or non-reception of the SIB-IW depending on a success or failure of the CRC check. For example, in case where an antenna port of a subordinate BS is one in number, the CRC mask representing the SIB-IW can be [1,0, 1,0,1,0,1,0,1,0,1,0,1,0]. In case where the antenna port of the subordinate BS is two in number, the CRC mask can be [1,1,1,1,0,0,0,0,1,1,1,1,0,0,0,0] and [0,0,0,0,1,1,1,1,0,0,0,0, 1,1,1,1] corresponding to the SIB-IW. If the MIB is not the MIB as the SIB-IW, the MS proceeds to step 709.

Alternatively, if the MIB is the MIB as the SIB-IW, the MS recognizes that the MS is accessible to the subordinate BS and, in step 719, perform a handover procedure to the subordinate BS. More particularly, the MS sends a message (e.g., a measurement report message) of informing a success of reception of the SIB-IW to the upper BS, and receives a message (e.g., a handover command message) of informing an acceptance or non-acceptance of handover from the upper BS.

Figure 8:
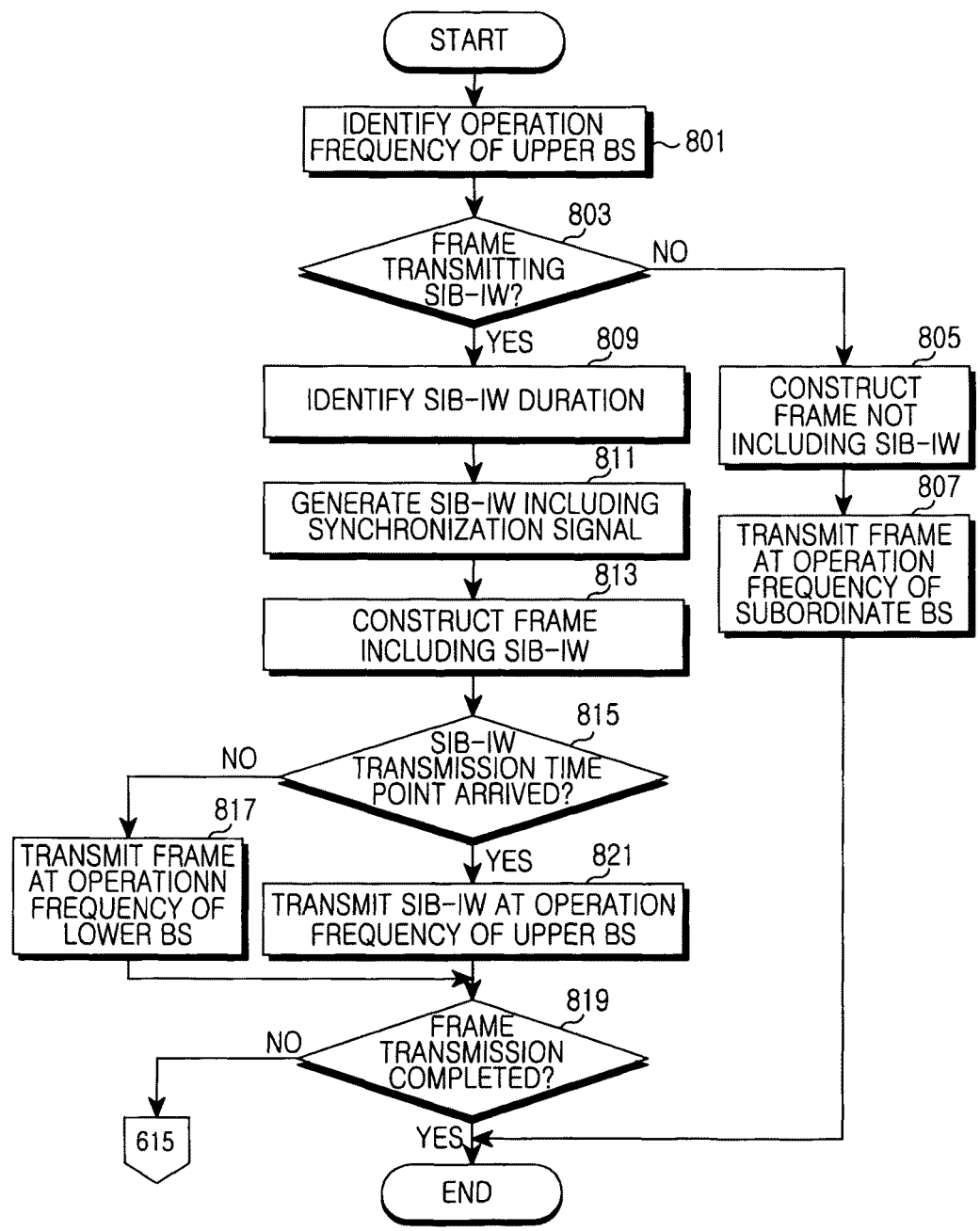
FIG. 8 illustrate an operation procedure of a subordinate BS in a broadband wireless communication system according to a second exemplary embodiment of the present invention.

FIG. 8 illustrates an operation procedure of a subordinate BS in a broadband wireless communication system according to a second exemplary embodiment of the present invention. FIG. 8 illustrates the operation procedure of the subordinate BS for transmitting SIB-IW according to an asynchronous scheme as in FIG. 2A.

Referring to FIG. 8, in step 801, the subordinate BS identifies an operation frequency band of an upper BS. At this time, the subordinate BS identifies the operation frequency band of the upper BS by searching a wireless channel, or acquires operation frequency information of the upper BS through the backhaul network.

Then, the subordinate BS proceeds to step 803 and identifies if a current frame is a frame transmitting the SIB-IW. At this time, the transmission or non-transmission of the SIB-IW is determined by the subordinate BS, and the transmission of the SIB-IW is implemented by periods. Here, SIB-IW configuration information is received through a broadcasting message including an SIB of the upper BS, or is acquired through the backhaul network.

If the current frame is not the frame transmitting the SIB-IW, the subordinate BS proceeds to step 805 and constructs a frame not including the SIB-IW. For example, in case where the subordinate BS uses the same-structure frame as the upper BS, the subordinate BS constructs a frame, which includes a plurality of subframes but includes a control channel at a front end of each subframe and includes a synchronization signal and an MIB at partial subframes.

After constructing the frame not including the SIB-IW, the subordinate BS proceeds to step 807 and transmits the frame at an operation frequency of the subordinate BS. That is, the subordinate BS transmits DL signals to MSs located within its own cell. But, in case where no MS has access to the subordinate BS, or MSs do not perform communication although being in access to the subordinate BS, the subordinate BS does not perform steps 805 and 807.

If the current frame is the frame transmitting the SIB-IW in step 803, the subordinate BS proceeds to step 809 and determines an SIB-IW duration. At this time, the subordinate BS determines the SIB-IW duration for itself like the frame transmitting the SIB-IW.

After determining the SIB-IW duration, the subordinate BS proceeds to step 811 and generates the SIB-IW including a synchronization signal. That is, the subordinate BS constructs a message including system information of the subordinate BS, converts the message into complex symbols through coding and modulation, and then performs scrambling. At this time, the subordinate BS applies predefined channel coding scheme, modulation scheme, and scrambling code for the sake of the SIB-IW. And, the subordinate BS generates the synchronization signal for the SIB-IW. That is, the SIB-IW includes the synchronization signal and SIB-IW information. At this time, a synchronization signal of the subordinate BS can be used as the synchronization signal for the SIB-IW. In this case, the SIB-IW information has a structure of an MIB. Thus, in order to represent that the MIB as the SIB-IW information is for the SIB-IW, the subordinate BS applies a CRC mask representing the SIB-IW, to the MIB as the SIB-IW information. Here, the CRC mask can be varied depending on the number of antenna ports used to transmit the SIB-IW. For example, in case where the antenna port is one in number, the CRC mask representing the SIB-IW can be [1,0,1,0,1,0,1,0,1,0,1,0,1,0,1,0]. When the antenna port is two in number, the CRC mask representing the SIB-IW can be [1,1,1,1,0,0,0,0,1,1,1,1,0,0,0,0] and [0,0,0,0,1,1,1,1,0,0,0,0,1,1,1,1].

Then, the subordinate BS proceeds to step 813 and constructs a frame including the SIB-IW. For example, in case where the subordinate BS uses the same-structure frame as the upper BS, the subordinate BS constructs a frame, which includes a plurality of subframes but includes a control channel at a front end of each subframe and includes a synchronization signal and an MIB at partial subframes, particularly, includes the SIB-IW in a data channel. At this time, the SIB-IW is transmitted according to an asynchronous scheme and thus, the subordinate BS maps the SIB-IW signal without considering a reference signal of the upper BS. Also, the subordinate BS maps the SIB-IW and reference signals to the frame.

More particularly, in case where an antenna port is one in number and a general CP is applied, the subordinate BS maps the synchronization signal to two symbols and maps the SIB-IW information signal to four symbols following the two symbols but, at regular intervals, maps the reference signals to partial tones within a $1^{st}$ symbol and a next symbol of a $4^{th}$ symbol among the symbols having mapped the SIB-IW information signal. For example, the subordinate BS maps the reference signals to $6n^{th}$ tones of the $1^{st}$ symbol on frequency axis and $(6n-3)^{th}$ tones of the next symbol of the $4^{th}$ symbol on frequency axis. Here, the 'n' is a positive integer.

In case where the antenna port is one in number and an extended CP is applied, the subordinate BS maps the synchronization signal to two symbols and maps the SIB-IW information signal to four symbols following the two symbols but, at regular intervals, maps the reference signals to partial tones within $1^{st}$ and $4^{th}$ symbols among the symbols having mapped the SIB-IW information signal. For example, the subordinate BS maps the reference signals to $6n^{th}$ tones of the $1^{st}$ symbol on frequency axis and $(6n-3)^{th}$ tones of the $4^{th}$ symbol on frequency axis. Here, the 'n' is a positive integer.

In case where the antenna port is two in number and the general CP is applied, the subordinate BS maps the synchronization signal to two symbols and maps the SIB-IW information signal to four symbols following the two symbols but, at regular intervals, maps reference signals of each antenna to partial tones within a $1^{st}$ symbol and a next symbol of a $4^{th}$ symbol among the symbols having mapped the SIB-IW information signal. For example, the subordinate BS maps reference signals of a first antenna to $6n^{th}$ tones of the $1^{st}$ symbol on frequency axis and $(6n-3)^{th}$ tones of the next symbol of the $4^{th}$ symbol on frequency axis, and maps reference signals of a second antenna to $(6n-3)^{th}$ tones of the $1^{st}$ symbol on frequency axis and $6n^{th}$ tones of the next symbol of the $4^{th}$ symbol on frequency axis. Here, the 'n' is a positive integer.

In case where the antenna port is two in number and the extended CP is applied, the subordinate BS maps the synchronization signal to two symbols and maps the SIB-IW information signal to four symbols following the two symbols but, at regular intervals, maps reference signals of each antenna to partial tones within $1^{st}$ and $4^{th}$ symbols among the symbols having mapped the SIB-IW information signal. For example, the subordinate BS maps reference signals of a first antenna to $6n^{th}$ tones of the $1^{st}$ symbol on frequency axis and $(6n-3)^{th}$ tones of the $4^{th}$ symbol on frequency axis, and maps reference signals of a second antenna to $(6n-3)^{th}$ tones of the $1^{st}$ symbol on frequency axis and $6n^{th}$ tones of the $4^{th}$ symbol on frequency axis. Here, the 'n' is a positive integer.

But, according to another implementation of the present invention, the subordinate BS can map the synchronization signal and the SIB-IW information signal at intervals of subframes of a predefined number or symbols of a predefined number.

After constructing the frame including the SIB-IW in step 813, the subordinate BS proceeds to step 815 and identifies if a time point of transmission of the SIB-IW has arrived. That is, the subordinate BS identifies if the SIB-IW duration starts continuously at the same time of a start of transmission of the frame.

If the time point of transmission of the SIB-IW does not arrive, the subordinate BS proceeds to step 817 and transmits the frame at the operation frequency of the subordinate BS. That is, the subordinate BS transmits DL signals to MSs having access to the subordinate BS. But, in case where no MS has access to the subordinate BS, or MSs do not perform communication although being in access to the subordinate BS, the subordinate BS does not perform step 817.

Then, the subordinate BS proceeds to step 819 and identifies if the transmission of the frame has been completed. That is, the subordinate BS identifies if the transmission of the frame constructed in step 813 has been completed. If the transmission of the frame is completed, the subordinate BS terminates the procedure according to the exemplary embodiment of the present invention. If the transmission of the frame is not completed, the subordinate BS returns to step 815.

If the time point of transmission of the SIB-IW arrives in step 815, the subordinate BS proceeds to step 821 and transmits the SIB-IW at an operation frequency of the upper BS. That is, the subordinate BS changes an operation frequency into the operation frequency of the upper BS, converts the SIB-IW mapped on the frame into OFDMA symbols through IFFT operation and CP insertion, up-converts the OFDMA symbols into a Radio Frequency (RF) band signal, and transmits the RF band signal through an antenna. At this time, after being in symbol synchronization with the upper BS, the subordinate BS transmits the SIB-IW.

Figure 9:
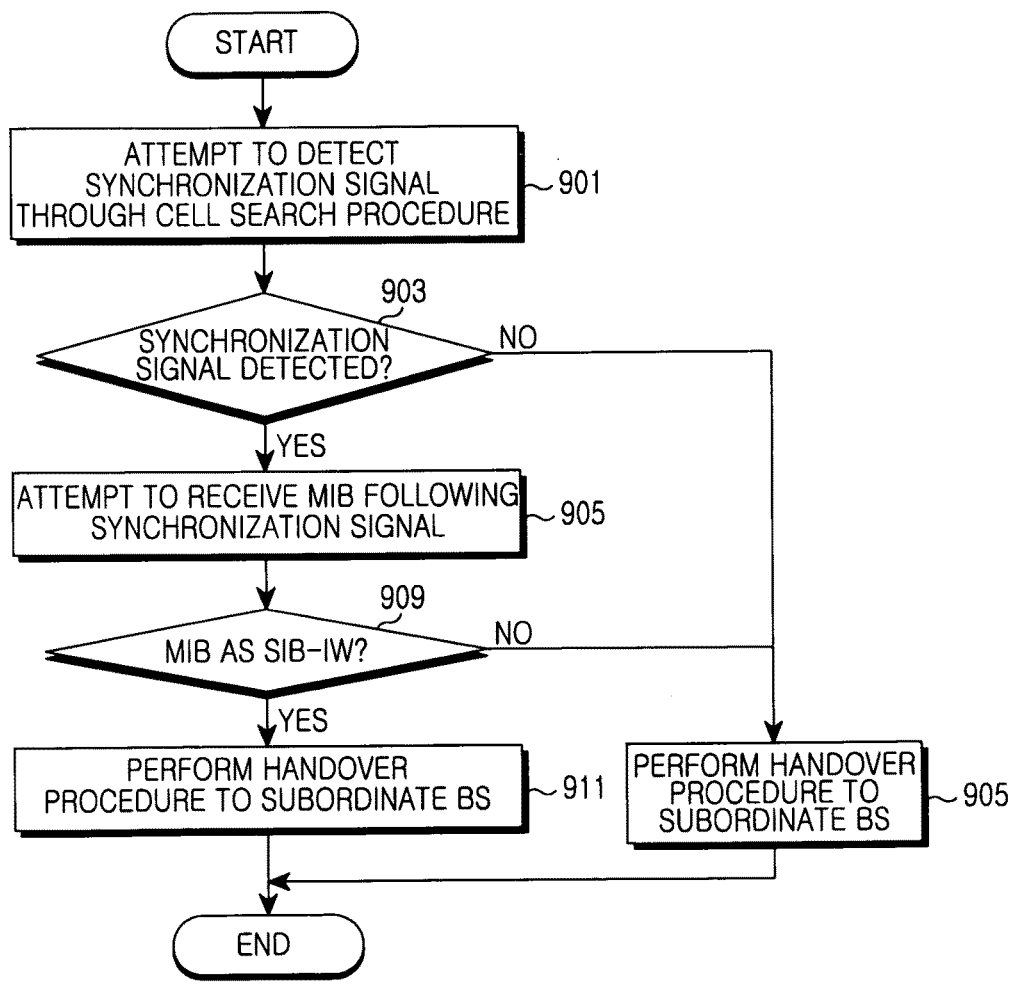
FIG. 9 illustrate an operation procedure of an MS in a broadband wireless communication system according to a second exemplary embodiment of the present invention.

FIG. 9 illustrates an operation procedure of an MS in a broadband wireless communication system according to a second exemplary embodiment of the present invention. FIG. 9 illustrates the operation procedure of the MS for, in case where SIB-IW is transmitted according to an asynchronous scheme as in FIG. 2A, receiving the SIB-IW.

Referring to FIG. 9, in step 901, the MS attempts to detect a synchronization signal of a BS other than a serving upper BS through a cell search procedure. Here, the cell search procedure is a background operation continuously carried out during an operation of the MS, and is for detecting a synchronization signal of an adjacent upper BS. Thus, the cell search procedure is continuously carried out irrespective of the progress of the procedure according to the exemplary embodiment of the present invention, and step 901 is for emphasizing the utilization of the cell search procedure in the procedure according to the exemplary embodiment of the present invention. Thus, in case where a synchronization signal for the SIB-IW has the same structure as the synchronization signal of the BS, the MS can detect the synchronization signal for the SIB-IW through the cell search procedure.

Then, the MS proceeds to step 903 and identifies if the synchronization signal for the SIB-W is detected.

If the synchronization signal for the SIB-IW is not detected, the MS judges that there is not an adjacent subordinate BS and, in step 905, performs communication with an upper BS. That is, the MS identifies if there are resources allocated through a control channel at each subframe, and receives a DL signal through the allocated resources. Then, the MS returns to step 903.

Alternatively, if the synchronization signal for the SIB-IW is detected, the MS proceeds to step 907 and attempts to receive an MIB following the synchronization signal. In other words, the MS attempts to demodulate and decode a signal received through the MIB following the synchronization signal. More particularly, the MS estimates a channel using signals received through tones for a reference signal among tones within symbols following the synchronization signal, and attempts to demodulate and decode signals received through data tones using the estimated channel.

After attempting to receive the MIB, the MS proceeds to step 909 and identifies if the MIB is an MIB as SIB-IW. At this time, whether the MIB is the SIB-IW is judged through a CRC mask. Thus, the MS performs a CRC check for a bit stream restored from the signal received through the MIB, using the CRC mask representing the SIB-IW and then, the MS judges reception or non-reception of the SIB-IW depending on a success or failure of the CRC check. For example, in case where an antenna port of a subordinate BS is one in number, the CRC mask representing the SIB-IW can be [1,0, 1,0,1,0,1,0,1,0,1,0,1,0]. In case where the antenna port of the subordinate BS is two in number, the CRC mask can be [1,1,1,1,0,0,0,0,1,1,1,1,0,0,0,0] and [0,0,0,0,1,1,1,1,0,0,0,0, 1,1,1,1] corresponding to the SIB-IW. If the MIB is not the MIB as the SIB-IW, the MS proceeds to step 905.

Alternatively, if the MIB is the MIB as the SIB-IW, the MS proceeds to step 909 and performs a handover procedure to the subordinate BS. More particularly, the MS sends a message (e.g., a measurement report message) of informing a success of reception of the SIB-IW to the upper BS, and receives a message (e.g., a handover command message) of informing an acceptance or non-acceptance of handover from the upper BS.

Figure 10:
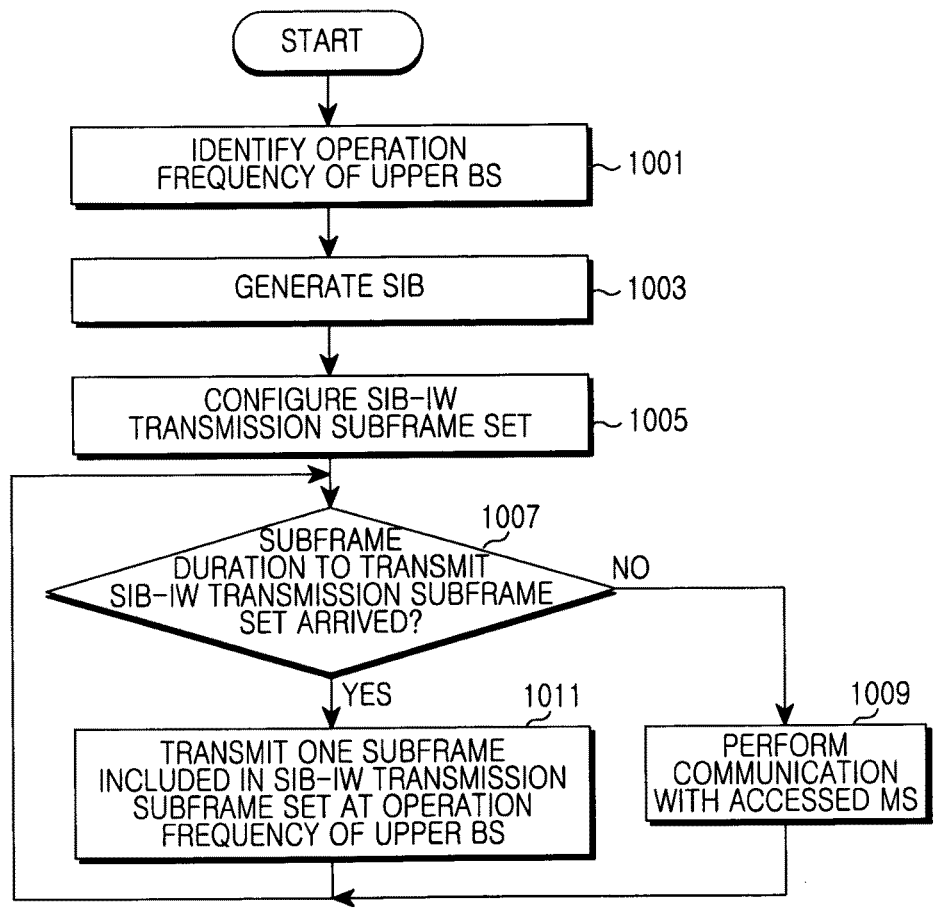
FIG. 10 illustrate an operation procedure of a subordinate BS in a broadband wireless communication system according to a third exemplary embodiment of the present invention.

FIG. 10 illustrates an operation procedure of a subordinate BS in a broadband wireless communication system according to a third exemplary embodiment of the present invention. FIG. 10 illustrates the operation procedure of the subordinate BS in case where an SIB-IW transmission subframe set is transmitted according to an asynchronous scheme as in FIG. 4A.

Referring to FIG. 10, in step 1001, the subordinate BS identifies an operation frequency band of an upper BS. At this time, the subordinate BS identifies the operation frequency band of the upper BS by searching a wireless channel, or acquires operation frequency information of the upper BS through a backhaul network.

Then, the subordinate BS proceeds to step 1003 and generates an SIB. That is, the subordinate BS constructs a message including system information of the subordinate BS, converts the message into complex symbols through coding and modulation, and then performs scrambling. At this time, the subordinate BS applies predefined channel coding scheme, modulation scheme, and scrambling code for the sake of the SIB. Here, the SIB includes operation frequency information of the subordinate BS, transmission scheduling information of an SIB-IW transmission subframe set, and information for judging accessibility or non-accessibility to the subordinate BS. The transmission scheduling information of the SIB-IW transmission subframe set can be configured in a form of an index representing one of a plurality of predefined transmission types.

After generating the SIB, the subordinate BS proceeds to step 1005 and configures an SIB-IW transmission subframe set. Here, the SIB-IW transmission subframe set includes a plurality of subframes, and includes two or more types of subframes. For example, the SIB-IW transmission subframe set includes at least two or more types of subframes among a first type subframe including a synchronization signal and an MIB, a second type subframe including the synchronization signal, and a third type subframe including the synchronization signal and the SIB. Here, the synchronization signal included in the SIB-IW transmission subframe set has the same physical layer structure as a synchronization signal transmitted through an operation frequency band of the subordinate BS, and the SIB has the same physical layer structure as an SIB transmitted through the operation frequency band of the subordinate BS. At this time, a frequency-axis size of the SIB-IW transmission subframe set is less than or is equal to a frame bandwidth of the upper BS.

Then, the subordinate BS proceeds to step 1007 and identifies if a subframe duration to transmit the SIB-IW transmission subframe set has arrived. That is, the SIB-IW transmission subframe set is transmitted in a unit of subframe, and subframes of each kind are transmitted according to determined order. For example, the subframes included in the SIB-IW transmission subframe set are transmitted in order of the first type subframe, the second type subframe, and the third type subframe. Here, the subframe duration transmitting the SIB-IW transmission subframe set is positioned in a remaining duration besides the duration for which the subordinate BS transmits a synchronization signal at the operation frequency of the subordinate BS.

If the subframe duration to transmit the SIB-IW transmission subframe set does not arrive, the subordinate BS proceeds to step 1009 and performs communication with MSs having access to the subordinate BS at the operation frequency of the subordinate BS.

Alternatively, if the subframe duration to transmit the SIB-IW transmission subframe set arrives, the subordinate BS proceeds to step 1011 and transmits one subframe included in the SIB-IW transmission subframe set, at the operation frequency of the upper BS. That is, the subordinate BS transmits one of the first type subframe, the second type subframe, and the third type subframe according to determined order at the operation frequency of the upper BS. At this time, the subordinate BS temporarily discontinues communication during the duration of one or a plurality of subframes at the operation frequency band of the subordinate BS. Here, the number of subframes of the duration discontinuing the communication is determined according to the time necessary for operation frequency change. Thus, the subordinate BS does not schedule data transmission to an accessed MS at its own operation frequency band during the duration for which the communication is discontinued to transmit the SIB-IW transmission subframe set, or informs the MS that it is a null subframe. But, in case where the subordinate BS can simultaneously transmit a signal at a plurality of frequency bands, the subordinate BS does not discontinue the communication at the operation frequency of the subordinate BS.

Operations of subordinate BSs according to fourth and fifth exemplary embodiments of the present invention are almost similar to the operation according to the third exemplary embodiment illustrated in FIG. 10, but steps 1003 and 1005 are different.

More particularly, according to the fourth exemplary embodiment of the present invention, in step 1003, the subordinate BS generates an SIB and SIB-IW. Here, the SIB includes scheduling information of the SIB-IW, and the SIB-IW includes information for an access to the subordinate BS. Then, the subordinate BS proceeds step 1005 and configures an SIB-IW transmission subframe set, which includes at least two or more types of subframes among a first type subframe including a synchronization signal and an MIB, a second type subframe including the synchronization signal, a third type subframe including the synchronization signal, the SIB, and the SIB-IW, a fourth type subframe including the synchronization signal, the SIB, and the SIB-IW, a fifth type subframe including the synchronization signal, the MIB, and the SIB-IW, and a sixth type subframe including the SIB-IW.

According to the fifth exemplary embodiment of the present invention, in step 1003, the subordinate BS generates an SIBx. Here, the SIBx includes information for an access to the subordinate BS. Then, the subordinate BS proceeds to step 1005 and configures an SIB-IW transmission subframe set, which includes at least two or more types of subframes among a first type subframe including a synchronization signal and an MIB, a second type subframe including the synchronization signal, a third type subframe including the synchronization signal and the SIBx, a fourth type subframe including the synchronization signal and an SIB, a fifth type subframe including the synchronization signal, the MIB, and the SIBx, and a sixth type subframe including the SIBx.

Figure 11:
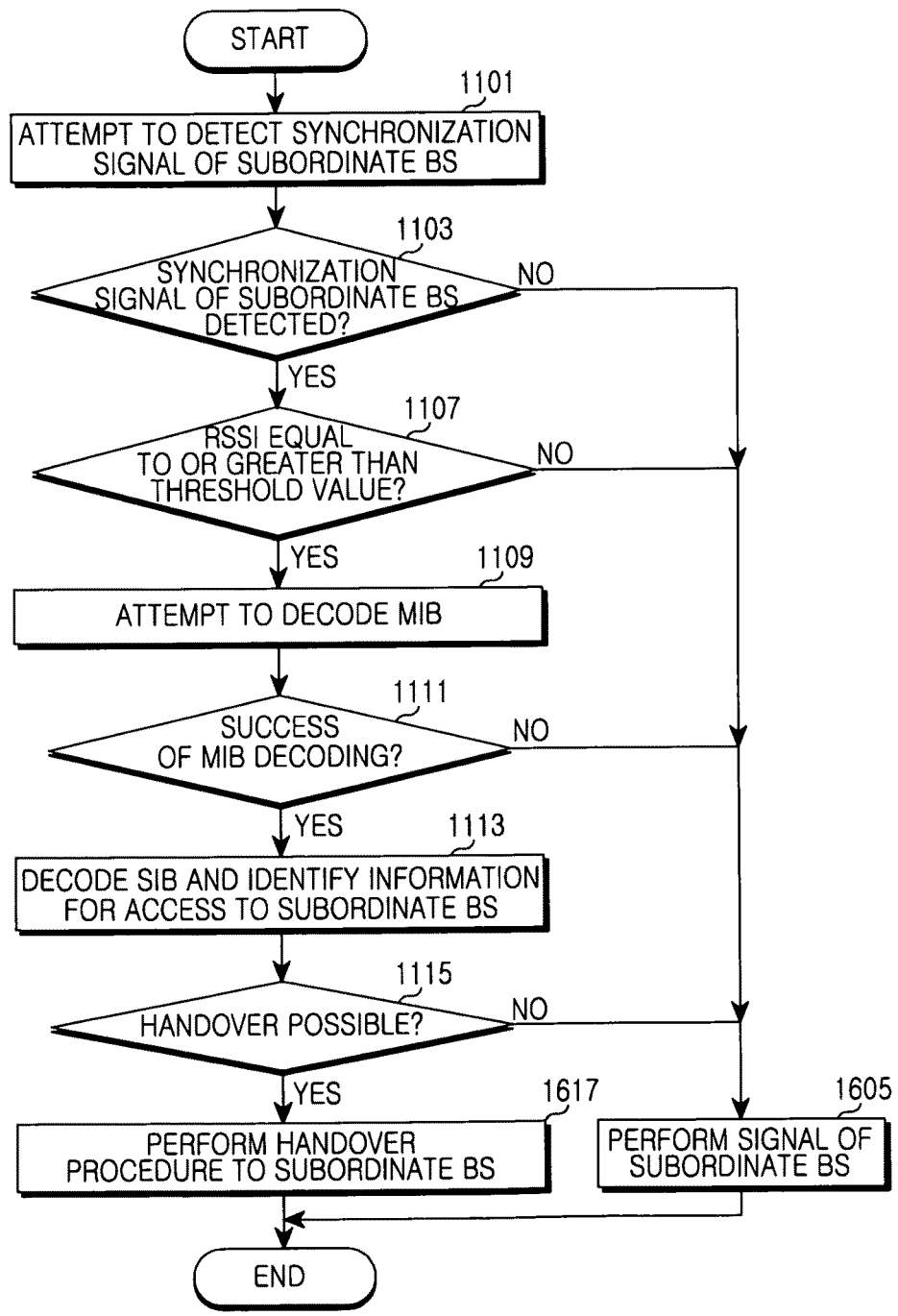
FIG. 11 illustrate an operation procedure of an MS in a broadband wireless communication system according to a third exemplary embodiment of the present invention.

FIG. 11 illustrates an operation procedure of an MS in a broadband wireless communication system according to a third exemplary embodiment of the present invention. FIG. 11 illustrates the operation procedure of the MS for, in case where an SIB-IW transmission subframe set including an SIB is transmitted according to an asynchronous scheme, receiving the SIB-IW transmission subframe set.

Referring to FIG. 11, in step 1101, the MS attempts to detect a synchronization signal of a subordinate BS at an operation frequency band of an upper BS during communication with the upper BS. The detecting of the synchronization signal for SIB-IW is periodically attempted, and is carried out using preamble sequences assigned for the SIB-IW.

Then, the MS proceeds to step 1103 and identifies if the synchronization signal of the subordinate BS is detected. In other words, the MS identifies if a synchronization signal constituted of one of preamble sequences assigned for the SIB-IW transmission subframe set of the subordinate BS is detected. If the synchronization signal for the SIB-IW is not detected, the MS proceeds to step 1105 and continues the communication with the upper BS.

Alternatively, if the synchronization signal for the SIB-IW is detected, the MS proceeds to step 1107 and identifies if an RSSI of the detected synchronization signal is equal to or is greater than a threshold value. That is, the MS judges if a channel state with the subordinate BS having transmitted the detected synchronization signal is as good as the MS can perform communication. If the RSSI of the detected synchronization signal is less than the threshold value, the MS proceeds to step 1105 and continues the communication with the upper BS.

Alternatively, if the RSSI of the detected synchronization signal is equal to or is greater than the threshold value, the MS proceeds to step 1109 and attempts to decode an MIB of the subordinate BS having transmitted the synchronization signal. That is, the MS acquires synchronization with the subordinate BS using the synchronization signal, and attempts to decode the MIB transmitted following the synchronization signal. At this time, because the synchronization signal (i.e., the synchronization signal and the MIB) can be received through the same subframe, the MS attempts to decode an MIB of a subframe having detected the synchronization signal, or attempts to decode an MIB received after the lapse of a predetermined time in consideration of an MIB transmission period starting from the subframe having detected the synchronization signal.

Then, the MS proceeds to step 1111 and identifies if there is a success or failure of the decoding of the MIB. For example, the MS identifies if information included in the MIB is identified with no error occurring as the CRC check result. If there is the failure of the decoding of the MIB, the MS proceeds to step 1105 and continues the communication with the upper BS.

Alternatively, if there is the success of the decoding of the MIB, the MS proceeds to step 1113 and decodes an SIB, thus identifying information for an access to the subordinate BS. That is, because the SIB (SIB-IW→SIB) is received through a subframe after a predetermined time interval starting from a subframe having received the MIB, the MS decodes the SIB at a subframe where the SIB is expected to be received, and identifies operation frequency information of the subordinate BS, transmission scheduling information of an SIB-IW transmission subframe set, and information for judging accessibility or non-accessibility to the subordinate BS. The transmission scheduling information of the SIB-IW transmission subframe set can be configured in a form of an index representing one of a plurality of predefined transmission types.

Then, the MS proceeds to step 1115 and judges if a handover to the subordinate BS is possible using the information identified through the SIB. That is, the MS judges if the handover is possible in consideration of application or non-application of a CSG of the subordinate BS, a current CSG mode, and the like. For example, in case where the subordinate BS does not apply the CSG or is in an open mode although applying the CSG, the MS judges that the handover to the subordinate BS is possible. Alternatively, in case where the subordinate BS applies the CSG and is in a close mode or hybrid mode, the MS judges if the handover to the subordinate BS is possible, by judging if an access to the subordinate BS is permitted. If the handover to the subordinate BS is impossible, the MS proceeds to step 1105 and continues the communication with the upper BS.

Alternatively, if the handover to the subordinate BS is possible, the MS proceeds to step 1117 and performs a handover procedure to the subordinate BS. More particularly, the MS sends a message (e.g., a measurement report message) of informing a success of reception of the SIB-IW to the upper BS, and receives a message (e.g., a handover command message) of informing an acceptance or non-acceptance of handover from the upper BS.

Figure 12:
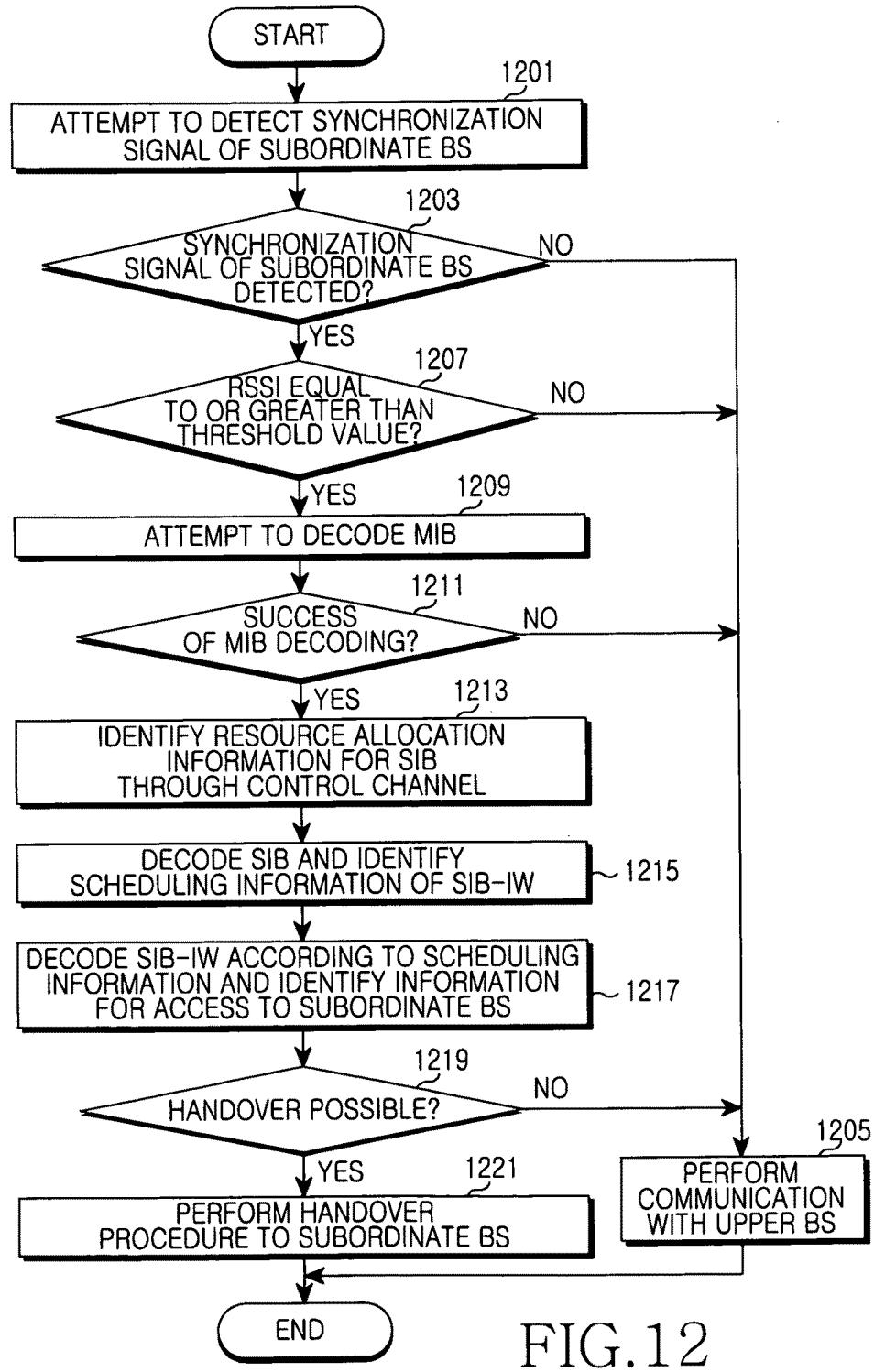
FIG. 12 illustrate an operation procedure of an MS in a broadband wireless communication system according to a fourth exemplary embodiment of the present invention.

FIG. 12 illustrates an operation procedure of an MS in a broadband wireless communication system according to a fourth exemplary embodiment of the present invention. FIG. 12 illustrates the operation procedure of the MS for, in case where an SIB-IW transmission subframe set including an SIB and SIB-IW is transmitted according to an asynchronous scheme, receiving the SIB-IW transmission subframe set.

Referring to FIG. 12, in step 1201, the MS attempts to detect a synchronization signal of a subordinate BS at an operation frequency band of an upper BS during communication with the upper BS. The detecting of the synchronization signal for the SIB-IW is periodically attempted, and is carried out using preamble sequences assigned for the SIB-IW.

Then, the MS proceeds to step 1203 and identifies if the synchronization signal of the subordinate BS is detected. In other words, the MS identifies if a synchronization signal constituted of one of preamble sequences assigned for the SIB-IW transmission subframe set of the subordinate BS is detected. If the synchronization signal for the SIB-IW is not detected, the MS proceeds to step 1205 and continues the communication with the upper BS.

Alternatively, if the synchronization signal for the SIB-IW is detected, the MS proceeds to step 1207 and identifies if an RSSI of the detected synchronization signal is equal to or is greater than a threshold value. That is, the MS judges if a channel state with the subordinate BS having transmitted the detected synchronization signal is as good as the MS can perform communication. If the RSSI of the detected synchronization signal is less than the threshold value, the MS proceeds to step 1205 and continues the communication with the upper BS.

Alternatively, if the RSSI of the detected synchronization signal is equal to or is greater than the threshold value, the MS proceeds to step 1209 and attempts to decode an MIB of the subordinate BS having transmitted the synchronization signal. That is, the MS acquires synchronization with the subordinate BS using the synchronization signal, and attempts to decode the MIB transmitted following the synchronization signal. At this time, because the synchronization signal (i.e., the synchronization signal and the MIB) can be received through the same subframe, the MS attempts to decode an MIB of a subframe having detected the synchronization signal, or attempts to decode an MIB received after the lapse of a predetermined time in consideration of an MIB transmission period starting from the subframe having detected the synchronization signal.

Then, the MS proceeds to step 1211 and identifies if there is a success or failure of the decoding of the MIB. For example, the MS identifies if information included in the MIB is identified with no error occurring as the CRC check result. If there is the failure of the decoding of the MIB, the MS proceeds to step 1205 and continues the communication with the upper BS.

Alternatively, if there is the success of the decoding of the MIB, the MS proceeds to step 1213 and identifies resource allocation information for an SIB through a control channel. That is, by decoding the control channel of a subframe including the SIB, the MS identifies information necessary for SIB decoding such as a position of the SIB, an MCS level, and so forth.

Then, the MS proceeds to step 1215 and decodes the SIB, thus identifying scheduling information of SIB-IW. Here, the scheduling information of the SIB-IW includes at least one of a number and period of a subframe where the SIB-IW is transmitted.

After identifying the scheduling information of the SIB-IW, the MS proceeds to step 1217 and decodes the SIB-IW according to the scheduling information, thereby identifying information for an access to the subordinate BS. That is, by decoding the SIB, the MS identifies operation frequency information of the subordinate BS, transmission scheduling information of an SIB-IW transmission subframe set, and information for judging accessibility or non-accessibility to the subordinate BS. The transmission scheduling information of the SIB-IW transmission subframe set can be configured in a form of an index representing one of a plurality of predefined transmission types.

Then, the MS proceeds to step 1219 and judges if a handover to the subordinate BS is possible using the information identified through the SIB. That is, the MS judges if the handover is possible in consideration of application or non-application of a CSG of the subordinate BS, a current CSG mode, and the like. For example, in case where the subordinate BS does not apply the CSG or is in an open mode although applying the CSG, the MS judges that the handover to the subordinate BS is possible. Alternatively, in case where the subordinate BS applies the CSG and is in a close mode or hybrid mode, the MS judges if the handover to the subordinate BS is possible, by judging if an access to the subordinate BS is permitted. If the handover to the subordinate BS is impossible, the MS proceeds to step 1205 and continues the communication with the upper BS.

Alternatively, if the handover to the subordinate BS is possible, the MS proceeds to step 1221 and performs a handover procedure to the subordinate BS. More particularly, the MS sends a message (e.g., a measurement report message) of informing a success of reception of the SIB-IW to the upper BS, and receives a message (e.g., a handover command message) of informing an acceptance or non-acceptance of handover from the upper BS.

Figure 13:
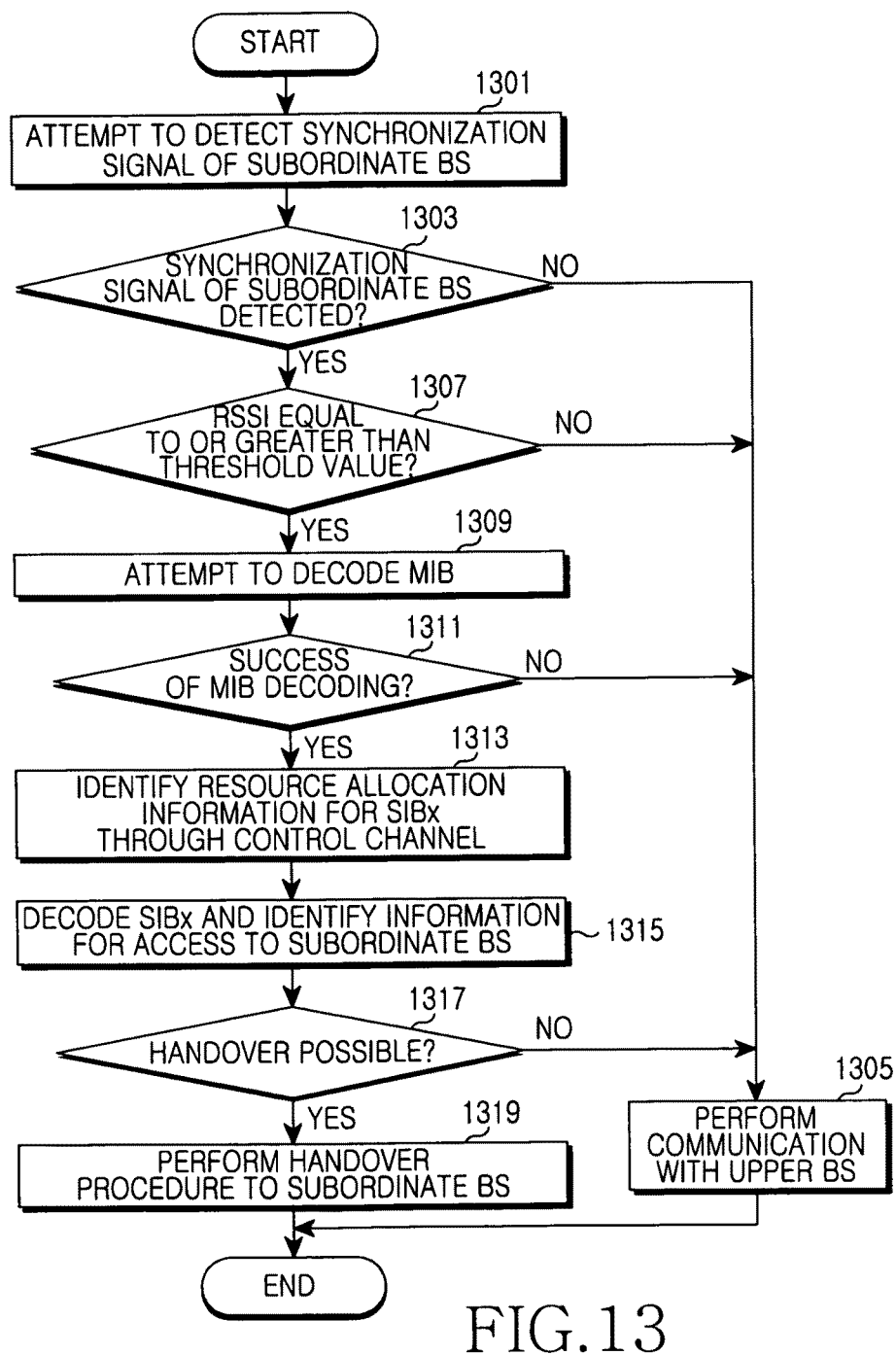
FIG. 13 illustrates an operation procedure of an MS in a broadband wireless communication system according to a fifth exemplary embodiment of the present invention.

FIG. 13 illustrates an operation procedure of an MS in a broadband wireless communication system according to a fifth exemplary embodiment of the present invention. FIG. 13 illustrates the operation procedure of the MS for, in case where an SIB-IW transmission subframe set including an SIBx is transmitted according to an asynchronous scheme, receiving the SIB-IW transmission subframe set.

Referring to FIG. 13, in step 1301, the MS attempts to detect a synchronization signal of a subordinate BS at an operation frequency band of an upper BS during communication with the upper BS. The detecting of the synchronization signal for the SIB-IW is periodically attempted, and is carried out using preamble sequences assigned for the SIB-IW.

Then, the MS proceeds to step 1303 and identifies if the synchronization signal of the subordinate BS is detected. In other words, the MS identifies if a synchronization signal constituted of one of preamble sequences assigned for the SIB-IW transmission subframe set of the subordinate BS is detected. If the synchronization signal for the SIB-IW is not detected, the MS proceeds to step 1305 and continues the communication with the upper BS.

Alternatively, if the synchronization signal for the SIB-IW is detected, the MS proceeds to step 1307 and identifies if an RSSI of the detected synchronization signal is equal to or is greater than a threshold value. That is, the MS judges if a channel state with the subordinate BS having transmitted the detected synchronization signal is as good as the MS can perform communication. If the RSSI of the detected synchronization signal is less than the threshold value, the MS proceeds to step 1305 and continues the communication with the upper BS.

Alternatively, if the RSSI of the detected synchronization signal is equal to or is greater than the threshold value, the MS proceeds to step 1309 and attempts to decode an MIB of the subordinate BS having transmitted the synchronization signal. That is, the MS acquires synchronization with the subordinate BS using the synchronization signal, and attempts to decode the MIB transmitted following the synchronization signal. At this time, because the synchronization signal (i.e., the synchronization signal and the MIB) is received through the same subframe, the MS attempts to decode an MIB of a subframe having detected the synchronization signal, or attempts to decode an MIB received after the lapse of a predetermined time in consideration of an MIB transmission period starting from the subframe having detected the synchronization signal.

Then, the MS proceeds to step 1311 and identifies if there is a success or failure of the decoding of the MIB. For example, the MS identifies if information included in the MIB is identified with no error occurring as the CRC check result. If there is the failure of the decoding of the MIB, the MS proceeds to step 1305 and continues the communication with the upper BS.

Alternatively, if there is the success of the decoding of the MIB, the MS proceeds to step 1313 and identifies resource allocation information for an SIBx through a control channel. That is, by decoding the control channel of a subframe including the SIBx, the MS identifies information necessary for SIBx (SIB→MIBx) decoding such as a position of the SIBx, an MCS level, etc.

After identifying the resource allocation information for the SIBx, the MS proceeds to step 1315 and decodes the SIBx according to the resource allocation information, thereby identifying information for an access to the subordinate BS. That is, by decoding the SIBx, the MS identifies operation frequency information of the subordinate BS, transmission scheduling information of an SIB-IW transmission subframe set, and information for judging accessibility or non-accessibility to the subordinate BS. The transmission scheduling information of the SIB-IW transmission subframe set can be configured in a form of an index representing one of a plurality of predefined transmission types.

Then, the MS proceeds to step 1317 and judges if a handover to the subordinate BS is possible using the information identified through the SIBx. That is, the MS judges if the handover is possible in consideration of application or non-application of a CSG of the subordinate BS, a current CSG mode, and so forth. For example, in case where the subordinate BS does not apply the CSG or is in an open mode although applying the CSG, the MS judges that the handover to the subordinate BS is possible. Alternatively, in case where the subordinate BS applies the CSG and is in a close mode or hybrid mode, the MS judges if the handover to the subordinate BS is possible, by judging if an access to the subordinate BS is permitted. If the handover to the subordinate BS is impossible, the MS proceeds to step 1305 and continues the communication with the upper BS.

Alternatively, if the handover to the subordinate BS is possible, the MS proceeds to step 1319 and performs a handover procedure to the subordinate BS. More particularly, the MS sends a message (e.g., a measurement report message) of informing a success of reception of the SIB-IW to the upper BS, and receives a message (e.g., a handover command message) of informing an acceptance or non-acceptance of handover from the upper BS.

The ways for SIB-IW transmission according to various exemplary embodiments of the present invention are described with reference to FIGS. 2 to 11. In the aforementioned exemplary embodiments, by receiving SIB-IW of a subordinate BS or an SIB included in an SIB-IW transmission subframe set, an MS can judge accessibility or non-accessibility to the subordinate BS, and perform a handover to the subordinate BS. At this time, if a period of transmission of the SIB-IW or the SIB included in the SIB-IW transmission subframe set decreases, the MS is given more chances to judge the accessibility or non-accessibility to the subordinate BS. However, frequently transmitting the SIB-IW or the SIB included in the SIB-IW transmission subframe set works as an overhead of a system. Thus, there is a need for a way to minimize the overhead of the system but increase the chance to judge the accessibility or non-accessibility to the subordinate BS. Thus, the present invention proposes the following way, which can be embodied in addition to the aforementioned exemplary embodiments.

In order to increase the chance to judge the accessibility or non-accessibility to the subordinate BS as above, the present invention defines a new SIB including only the minimum information for judging if an MS is accessible to the subordinate BS. The subordinate BS according to an exemplary embodiment of the present invention transmits the new SIB over a period shorter than the period of transmission of the SIB-IW or SIB included in the SIB-IW transmission subframe set. For example, the new SIB can include only a cell global ID and a CSG ID. For description convenience, the new SIB is called an 'SIBx' below.

Thus, in order to judge the accessibility or non-accessibility to the subordinate BS, the MS decodes the SIBx after detecting an MIB of the subordinate BS. More particularly, the MS acquires synchronization with the subordinate BS through the MIB and then, receives the SIBx at a subframe of a predefined position. For the sake of this, the MS identifies a position of the SIBx using resource allocation information received through a control channel of the subframe, acquires a cell global ID and CSG ID of the subordinate BS by decoding an SIBx existing in a data channel within the subframe, and then judges the accessibility or non-accessibility to the subordinate BS. However, a BS not needing an access control does not transmit the SIBx. For example, because a macro upper BS of a 3GPP LTE Release 8 does not require to identify accessibility or non-accessibility, i.e., does not need the access control, the macro upper BS does not transmit the SIBx.

Figure 14:
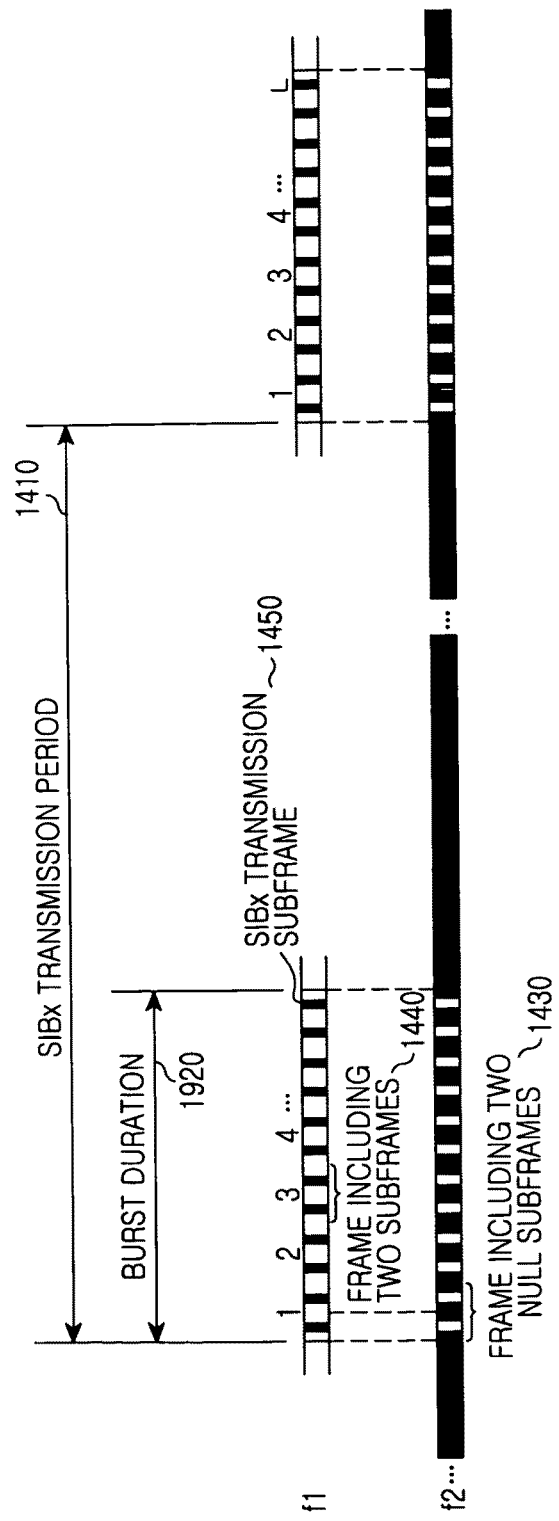
FIG. 14 illustrates an example of a system information transmission period of a subordinate BS in a broadband wireless communication system according to an exemplary embodiment of the present invention.

FIG. 14 illustrates an example of an SIBx transmission period in a broadband wireless communication system according to an exemplary embodiment of the present invention. FIG. 14 illustrates an example of a case where an SIBx is transmitted twice per frame.

As illustrated in FIG. 14, the SIBx is transmitted twice per frame within a burst duration 1420 every SIBx transmission period 1410. If one burst duration 1420 lapses, the SIBx is not transmitted until a next transmission period 1410 arrives. Thus, if a length of the burst duration 1420 is increasingly the same as that of the SIBx transmission period 1410, the SIBx is continuously transmitted according to a constant period. If the length of the burst duration 1420 decreases, a duration not transmitting the SIBx appears. Thus, by properly controlling the length of the burst duration 1420, the system can suppress the occurrence of interference in an upper BS, and minimize a loss of a transfer rate of a subordinate BS.

In a description from the operation aspect of the subordinate BS, the subordinate BS performs communication through its own carrier frequency (f2). If a time point of transmission of the SIBx arrives, the subordinate BS transmits the SIBx through a carrier frequency (f1) of a macro BS during the burst duration 1420. Due to this, during the burst duration 1420, frames 1430 including two null subframes are transmitted through the carrier frequency (f2) of the subordinate BS, and frames 1440 including only two subframes are transmitted through the carrier frequency (f1) of the macro BS. At this time, numbers of two subframes within each frame are fixed. In other words, the subordinate BS transmits the SIBx at regular intervals through a fixed number of subframes. At this time, the transmission of the SIBx is implemented according to one of the exemplary embodiments illustrated in FIGS. 2A and 2B and FIGS. 4A to 4C.

A feature of the SIBx is again arranged below. First, the SIBx can include information related to an access control. Second, the SIBx basically includes system information necessary for communication, and additionally includes information (e.g., DL frequency information and access-mode-related information) representing a quick handover to a BS transmitting the SIBx and a state of the BS. Third, the period of transmission of the SIBx is controlled in consideration of an excess resource amount of the BS transmitting the SIBx, a load amount, and the like. Fourth, the SIBx is transmitted through an operation frequency of an upper BS irrespective of intra-frequency handover and inter-frequency handover.

As described above, an MS having access to an upper BS can perform a handover to a subordinate BS by using SIB-IW or SIBx in a wireless communication system having a hierarchical cell structure. The aforementioned exemplary embodiments of the present invention can be applied to a case where the upper BS and the subordinate BS belong to different wireless communication systems in addition to a case where the upper BS and the subordinate BS belong to the same wireless communication system. For example, in case where the subordinate BS belongs to a 3GPP LTE system and the upper BS belongs to a Universal Mobile Telecommunications System (UMTS), the exemplary embodiments of the present invention can be applied if a handover between the 3GPP LTE system and the UMTS is possible. In this case, the 'f1' becomes a band of the UMTS and the 'f2' becomes a band of the 3GPP LTE system in the aforementioned exemplary embodiments of the present invention. Thus, upon system information transmission, the subordinate BS changes an operation frequency into the UMTS band and then, transmits SIB-IW, an SIBx, or an SIB-IW transmission subframe set in compliance with the UMTS transmission standard. Here, it is desirable that a period of transmission of the SIB-IW, the SIBx, or the SIB-IW transmission subframe set is set to 20 ms or an integer multiple of 20 ms.

Figure 15:
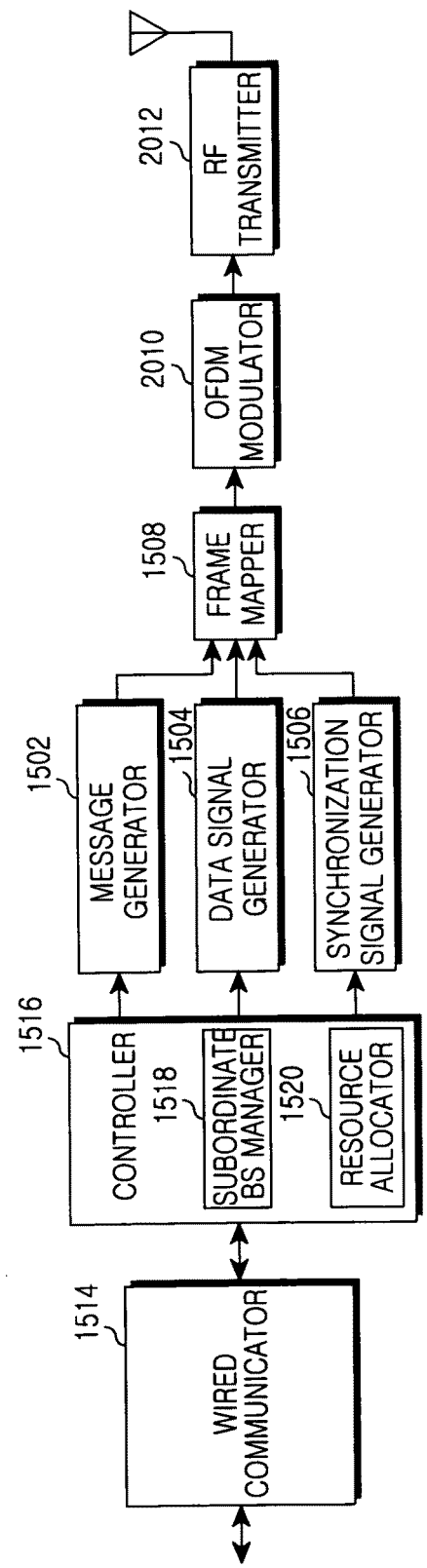
FIG. 15 illustrates a construction of an upper BS in a broadband wireless communication system according to an exemplary embodiment of the present invention.

FIG. 15 illustrates a construction of an upper BS in a broadband wireless communication system according to an exemplary embodiment of the present invention.

As illustrated in FIG. 15, the upper BS includes a message generator 1502, a data signal generator 1504, a synchronization signal generator 1506, a frame mapper 1508, an OFDM modulator 1510, an RF transmitter 1512, a wired communicator 1514, and a controller 1516.

The message generator 1502 generates a control message signal to be transmitted to MSs within a cell. That is, the message generator 1502 generates a message including control information to be transmitted and, by encoding and modulating a bit stream of the message, generates a message signal. For example, every subframe, the message generator 1502 generates a broadcasting message including system information transmitted through an MIB, and a message including resource allocation information transmitted through a control channel.

The data signal generator 1504 generates data signals to be transmitted to MSs within a cell. That is, by encoding and modulating transmission data to a corresponding MS according to the resource allocation result provided from the controller 1516, the data signal generator 1504 generates the data signals. The synchronization signal generator 1506 generates a PSS for time synchronization and an SSS for frame synchronization.

The frame mapper 1508 constructs a frame by mapping signals provided from the message generator 1502, the data signal generator 1504, and the synchronization signal generator 1506, to resources. At this time, in case of mapping the data signals, the frame mapper 1508 maps reference signals between the data signals according to a constant pattern. Here, the SIB-IW duration is a time and frequency resource duration allocated for transmission of the SIB-IW, and is the duration for which the upper BS transmits only a reference signal without transmitting a data signal. The OFDM modulator 1510 constructs OFDM symbols from the signals mapped by the frame mapper 1508 through Inverse Fast Fourier Transform (IFFT) operation and CP insertion. The RF transmitter 1512 converts the OFDM symbols into a signal of an operation frequency band, and then transmits the converted signal through an antenna.

The wired communicator 1514 provides an interface for, through a wired network, performing communication with other upper BSs, subordinate BSs within a cell, and an upper node.

The controller 1516 controls a general function of the upper BS. A subordinate BS manager 1518, which is included in the controller 1516, manages information on subordinate BSs installed within a cell. Thus, the controller 1516 provides the message generator 1502 and the wired communicator 1514 with information on the SIB-IW transmission time point and the SIB-IW duration. Also, the subordinate BS manager 1518 notifies a resource allocator 1520 of a position of the SIB-IW duration in order not to allocate resources of the SIB-IW duration for the purpose of data transmission. The resource allocator 1520 allocates resources to accessed MSs. But, the resource allocator 1520 allocates remaining resources excluding the resources within the SIB-IW duration.

Figure 16:
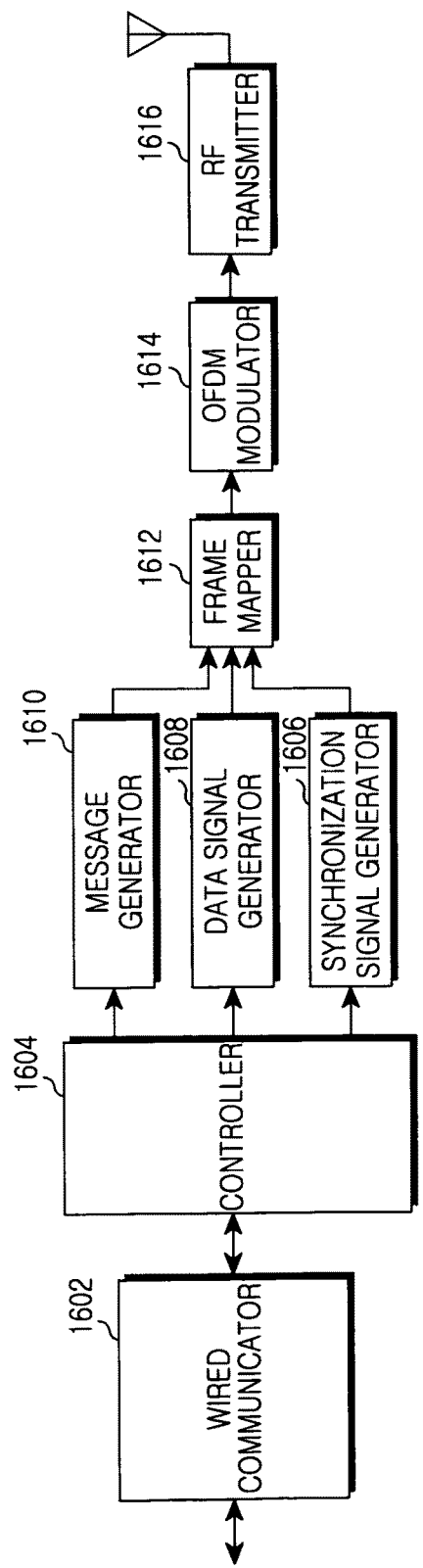
FIG. 16 illustrates a construction of a subordinate BS in a broadband wireless communication system according to an exemplary embodiment of the present invention.

FIG. 16 illustrates a construction of a subordinate BS in a broadband wireless communication system according to an exemplary embodiment of the present invention.

As illustrated in FIG. 16, the subordinate BS includes a wired communicator 1602, a controller 1604, a synchronization signal generator 1606, a data signal generator 1608, a message generator 1610, a frame mapper 1612, an OFDM modulator 1614, and an RF transmitter 1616.

The wired communicator 1602 provides an interface for performing communication with upper BSs and an upper node through a wired network.

The controller 1604 controls a general function of the subordinate BS. Particularly, the controller 1604 controls a function for transmitting SIB-IW or SIBx, which provides information necessary for an access to the subordinate BS. More particularly, the controller 1604 determines a time point of transmission the SIB-IW or SIBx, provides system information to the message generator 1610 to generate the SIB-IW or SIBx, and controls a transmission frequency of the SIB-IW or SIBx. According to a first exemplary embodiment of the present invention, the controller 1604 determines a time point of transmission of the SIB-IW through SIB-IW scheduling information, which is included in SIB-IW configuration information received from the upper BS or an upper network element. Alternatively, according to second and third exemplary embodiments of the present invention, the controller 1604 determines a time point of transmission of the SIB-IW according to its own judgment. Also, upon signal transmission to accessed MSs, the controller 1604 controls the RF transmitter 1616 to transmit a DL signal at an operation frequency of the subordinate BS. Upon the SIB-IW transmission, the controller 1604 controls the RF transmitter 1616 to transmit a signal at an operation frequency of the upper BS. Particularly, according to the third exemplary embodiment of the present invention, when a subframe duration to transmit an SIB-IW transmission subframe set has arrived, the controller 1604 controls and transmits one of a first type subframe including a synchronization signal and an MIB, a second type subframe including a synchronization signal, and a third type subframe including a synchronization signal and an SIB according to predefined order. According to a fourth exemplary embodiment of the present invention, when a subframe duration to transmit an SIB-IW transmission subframe set has arrived, the controller 1604 controls and transmits one of a first type subframe including a synchronization signal and an MIB, a second type subframe including a synchronization signal, and a third type subframe including a synchronization signal, an SIB, and SIB-IW according to predefined order. According to a fifth exemplary embodiment of the present invention, when a subframe duration to transmit an SIB-IW transmission subframe set has arrived, the controller 1604 controls and transmits one of a first type subframe including a synchronization signal and an MIB, a second type subframe including a synchronization signal, and a third type subframe including a synchronization signal and an SIBx according to predefined order. Here, the subframe duration transmitting the SIB-IW transmission subframe set is positioned in a remaining duration besides the duration for which the subordinate BS transmits a synchronization signal at an operation frequency of the subordinate BS. At this time, the controller 1604 temporarily discontinues communication during the duration of one or a plurality of subframes at the operation frequency band of the subordinate BS. Here, the number of subframes of the duration discontinuing the communication is determined according to the time necessary for operation frequency change.

The synchronization signal generator 1606 generates a PSS for time synchronization of MSs having access to the subordinate BS and an SSS for frame synchronization. Particularly, according to a first exemplary embodiment of the present invention, the synchronization signal generator 1606 generates a synchronization signal for the SIB-IW. For example, the PSS and the SSS can be used as the synchronization signal for the SIB-IW. In this case, if a time point of transmission of the SIB-IW arrives, the synchronization signal generator 1606 generates the synchronization signal and then, provides the synchronization signal to the frame mapper 1612.

The data signal generator 1608 generates data signals to be transmitted to MSs having access to the subordinate BS. That is, by encoding and modulating transmission data to a corresponding MS according to the resource allocation result provided from the controller 1604, the data signal generator 1608 generates the data signals. The message generator 1610 generates a control message signal to be transmitted to the MSs. Particularly, according to an exemplary embodiment of the present invention, the message generator 1610 generates the SIB-IW signal. That is, the message generator 1610 generates a message including system information of the subordinate BS to generate the SIB-IW signal, converts the message into complex symbols through coding and modulation, and performs scrambling. At this time, the message generator 1610 applies predefined channel coding scheme, modulation scheme, and scrambling code for the sake of the SIB-IW. That is, according to one of first and second exemplary embodiments of the present invention, the message generator 1610 and the synchronization signal generator 1606 generate the SIB-IW. Also, according one of third, fourth, and fifth exemplary embodiments of the present invention, the message generator 1610 generates a message including resource allocation information for SIB-IW or SIBx to be transmitted through a control channel of a subframe where the SIB-IW or SIBx is transmitted.

The frame mapper 1612 constructs a frame by mapping signals provided from the synchronization signal generator 1606, the data signal generator 1608, and the message generator 1610, to resources. At this time, in case of mapping to the data signals, the frame mapper 1612 maps reference signals between the data signals according to a constant pattern. Particularly, according to an exemplary embodiment of the present invention, the frame mapper 1612 constructs a frame including SIB-IW, or a frame not including the SIB-IW under control of the controller 1604. For example, in case where the subordinate BS uses the same-structure frame as the upper BS, the frame mapper 1612 constructs a frame, which includes a plurality of subframes but includes a control channel at a front end of each subframe and includes a synchronization signal and an MIB at partial subframes, particularly, includes the SIB-IW.

According to a first or second exemplary embodiment of the present invention, the SIB-IW is transmitted according to an asynchronous scheme and thus, the frame mapper 1612 maps the SIB-IW signal without considering a position of a resource for a reference signal of the upper BS. Also, the frame mapper 1612 maps the SIB-IW and reference signals to the frame.

In case where it accords to the first or second exemplary embodiment of the present invention, and an antenna port is one in number and a general CP is applied, the frame mapper 1612 maps the synchronization signal to two symbols and maps the SIB-IW information signal to four symbols following the two symbols but, at regular intervals, maps the reference signals to partial tones within a $1^{st}$ symbol and a next symbol of a $4^{th}$ symbol among the symbols having mapped the SIB-IW information signal. For example, the frame mapper 1612 maps the reference signals to $6n^{th}$ tones of the $1^{st}$ symbol on frequency axis and $(6n-3)^{th}$ tones of the next symbol of the $4^{th}$ symbol on frequency axis. Here, the 'n' is a positive integer.

In case where it accords to the first or second exemplary embodiment of the present invention, and the antenna port is one in number and an extended CP is applied, the frame mapper 1612 maps the synchronization signal to two symbols and maps the SIB-IW information signal to four symbols following the two symbols but, at regular intervals, maps the reference signals to partial tones within $1^{st}$ and $4^{th}$ symbols among the symbols having mapped the SIB-IW information signal. For example, the frame mapper 1612 maps the reference signals to $6n^{th}$ tones of the $1^{st}$ symbol on frequency axis and $(6n-3)^{th}$ tones of the $4^{th}$ symbol on frequency axis. Here, the is a positive integer.

In case where it accords to the first or second exemplary embodiment of the present invention, and the antenna port is two in number and the general CP is applied, the frame mapper 1612 maps the synchronization signal to two symbols and maps the SIB-IW information signal to four symbols following the two symbols but, at regular intervals, maps reference signals of each antenna to partial tones within a $1^{st}$ symbol and a next symbol of a $4^{th}$ symbol among the symbols having mapped the SIB-IW information signal. For example, the frame mapper 1612 maps reference signals of a first antenna to $6n^{th}$ tones of the $1^{st}$ symbol on frequency axis and $(6n-3)^{th}$ tones of the next symbol of the $4^{th}$ symbol on frequency axis, and maps reference signals of a second antenna to $(6n-3)^{th}$ tones of the $1^{st}$ symbol on frequency axis and $6n^{th}$ tones of the next symbol of the $4^{th}$ symbol on frequency axis. Here, the 'n' is a positive integer.

In case where it accords to the first or second exemplary embodiment of the present invention, and the antenna port is two in number and the extended CP is applied, the frame mapper 1612 maps the synchronization signal to two symbols and maps the SIB-IW information signal to four symbols following the two symbols but, at regular intervals, maps reference signals of each antenna to partial tones within $1^{st}$ and $4^{th}$ symbols among the symbols having mapped the SIB-IW information signal. For example, the frame mapper 1612 maps reference signals of a first antenna to $6n^{th}$ tones of the $1^{st}$ symbol on frequency axis and $(6n-3)^{th}$ tones of the $4^{th}$ symbol on frequency axis, and maps reference signals of a second antenna to $(6n-3)^{th}$ tones of the $1^{st}$ symbol on frequency axis and $6n^{th}$ tones of the $4^{th}$ symbol on frequency axis. Here, the is a positive integer.

According to a third, fourth, or fifth exemplary embodiment of the present invention, the frame mapper 1612 constructs one of the first type subframe, the second type subframe, and the third type subframe under control of the controller 1604.

The OFDM modulator 1614 constructs OFDM symbols from the signals mapped by the frame mapper 1612 through IFFT operation and CP insertion. The RF transmitter 1616 converts the OFDM symbols into a signal of a frequency band controlled by the controller 1604 and then, transmits the converted signal through an antenna.

Figure 17:
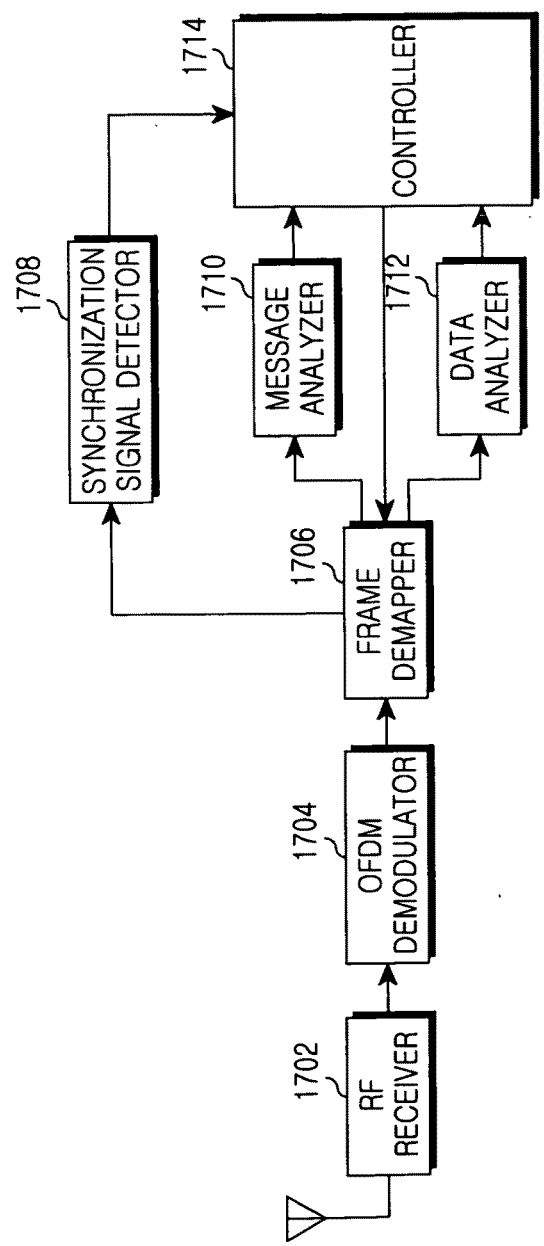
FIG. 17 illustrates a construction of an MS in a broadband wireless communication system according to an exemplary embodiment of the present invention.

FIG. 17 illustrates a construction of an MS in a broadband wireless communication system according to an exemplary embodiment of the present invention.

As illustrated in FIG. 17, the MS includes an RF receiver 1702, an OFDM demodulator 1704, a frame demapper 1706, a synchronization signal detector 1708, a message analyzer 1710, a data analyzer 1712, and a controller 1714.

The RF receiver 1702 down-converts a signal of an operation frequency band of an upper BS being in access, into a baseband signal. The OFDM demodulator 1704 splits the baseband signal into OFDM symbols, removes a CP, and restores signals mapped to a frame through Fast Fourier Transform (FFT) operation.

The frame demapper 1706 divides and extracts the signals mapped to the frame in a unit of processing, and provides the extracted signals to the synchronization signal detector 1708, the message analyzer 1710, and the data analyzer 1712. In case where the synchronization signal detector 1708 detects a synchronization signal of an upper BS other than a serving upper BS, the frame demapper 1706 extracts a signal mapped to symbols following the synchronization signal, and provides the extracted signal to the message analyzer 1710.

The synchronization signal detector 1708 attempts to detect PSSs and SSSs, which are transmitted by a serving upper BS, adjacent upper BSs, and subordinate BSs, from the signals provided from the frame demapper 1706. At this time, the detecting of the PSSs and SSSs transmitted by the adjacent upper BSs and the subordinate BSs is carried out by a cell search procedure being a background operation, and is continuously implemented. The data analyzer 1712 restores data from the signals provided from the frame demapper 1706.

The message analyzer 1710 restores a control message from the signals provided from the frame demapper 1706, and identifies information included in the control message. Particularly, according to a first exemplary embodiment of the present invention, the message analyzer 1710 identifies SIB-IW configuration information in a broadcasting message received through an MIB of a serving upper BS, and provides the SIB-IW configuration information to the controller 1714. Also, according to an exemplary embodiment of the present invention, if there is a success of reception of SIB-IW transmitted by a subordinate BS, the message analyzer 1710 informs the controller 1714 of the success.

According to a first or second exemplary embodiment of the present invention, the message analyzer 1710 performs demodulation and decoding for signals received through an MIB following the synchronization signal detected through the cell search procedure of the synchronization signal detector 1708, perform a CRC check using a CRC mask representing the SIB-IW, and then judges reception or non-reception of the SIB-IW depending on a success or failure of the CRC check. For example, in case where an antenna port is one in number, the CRC mask representing the SIB-IW can be [1,0,1,0,1,0,1,0,1,0,1,0,1,0]. In case where the antenna port is two in number, the CRC mask can be [1,1,1,1,0,0,0,0,1,1,1,1,0,0,0,0] and [0,0,0,0,1,1,1,1,0,0,0,0,1,1,1,1] corresponding to the SIB-IW.

According to a third exemplary embodiment of the present invention, under control of the controller 1714, the message analyzer 1710 performs demodulation and decoding for an MIB and an SIB, which are included in an SIB-IW transmission subframe set of a subordinate BS having transmitted a synchronization signal whose RSSI is equal to or greater than a threshold value. According to a fourth exemplary embodiment of the present invention, under control of the controller 1714, the message analyzer 1710 performs demodulation and decoding for an MIB, an SIB, and SIB-IW, which are included in an SIB-IW transmission subframe set having transmitted a synchronization signal whose RSSI is equal to or greater than a threshold value. According to a fifth exemplary embodiment of the present invention, under control of the controller 1714, the message analyzer 1710 performs demodulation and decoding for an MIB and an SIBx, which are included in an SIB-IW transmission subframe set of a subordinate BS having transmitted a synchronization signal whose RSSI is equal to or greater than a threshold value. That is, the message analyzer 1710 generates a scrambling code using a preamble sequence constituting the received synchronization signal, and attempts to decode an SIB using the scrambling code.

The controller 1714 controls a general function of the MS. Particularly, according to an exemplary embodiment of the present invention, the controller 1714 controls a function for receiving SIB-IW transmitted by a subordinate BS. According to a first or second exemplary embodiment of the present invention, if the synchronization signal detector 1708 detects a synchronization signal of an upper BS other than a serving upper BS, the controller 1714 controls the frame demapper 1706 to extract an MIB following the synchronization signal, and controls the message analyzer 1710 to identify if the MIB is SIB-IW. According to a third exemplary embodiment of the present invention, the controller 1714 controls the synchronization signal detector 1708 to periodically detect a synchronization signal included in an SIB-IW transmission subframe set of a subordinate BS. If the synchronization signal included in the SIB-IW transmission subframe set is detected, the controller 1714 judges if an RSSI of the detected synchronization signal is equal to or is greater than a threshold value. After that, if the RSSI is equal to or is greater than the threshold value, the controller 1714 controls the message analyzer 1710 to sequentially decode an MIB and SIB, SIB-IW, or an SIBx of the subordinate BS having transmitted the detected synchronization signal.

In a broadband wireless communication system supporting a femtocell, a femto BS transmits system information of a femtocell according to a proposed scheme of the present invention, whereby an MS can receive the system information of the femtocell without deteriorating the system performance and, simultaneously, irrespective of an operation frequency of the femto BS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An operation method of a femto Base Station (BS) in a wireless communication system supporting a femtocell, the method comprising:
    configuring a subframe set comprising at least two types of subframes among subframes having predefined different structures; and
    if a duration of a subframe carrying the subframe set arrives, transmitting one of the subframes comprised in the subframe set according to predefined order, wherein the duration is discontinuously distributed in a frame and no subframe is transmitted in a period other than the duration,
    wherein the subframes having the predefined different structures comprise:
        a first type subframe comprising a synchronization signal and a Master Information Block (MIB);
        a second type subframe comprising the synchronization signal;
        a third type subframe comprising the synchronization signal and system information;
        a fourth type subframe comprising the synchronization signal, the MIB, and the system information; and
        a fifth type subframe comprising the system information, and
    wherein the synchronization signal included in the subframe set is the same, in a physical layer structure, as a synchronization signal transmitted through an operation frequency band of the femtocell BS, and
    wherein the subframe set is transmitted during preset burst duration every preset system information transmission period, and the system information transmission period and the burst duration are defined in a unit of frame.

2. The method of claim 1, wherein the duration of a subframe carrying the subframe set arrives over a period of duration of five subframes.

3. The method of claim 1, wherein the system information comprises at least one of a plurality of parameters shown in a Table:

| Parameter | Content |
|---|---|
| plmn-IdntitList | PLMN (Public Land Mobile Network) identity list. The PLMN means one mobile communication service provider. |
| Cell Identity | Identity on cell of BS |
| CSG Idication | Indication representing if cell of BS transmitting system information is cell applying CSG (Closed Subscriber Group). |
| CSG Identity | Identity representing CSG mode. The CSG mode comprises at least one of open mode, close mode, and hybrid mode. |
| RAT-indicator | Identity indicating Radio Access Technology (RAT) of BS transmitting system information. |
| hybrid-access-mode indicator | Identity indicating hybrid access mode of BS transmitting system information. |
| TDD-indicator | Identity distinguishing duplex schemes of BS transmitting system information. |
| dl-CarrierFreqInfo | DL operation frequency information of BS transmitting system information. |
| Low-duty-mode-indicator | Identity representing current operation mode of BS transmitting system information. The operation mode is distinguished into first mode generally operating and second mode discontinuing partial function for power control. |
| ul-CarrierFreqInfo | UL operation frequency information of BS transmitting system information. Including only in case of operating in Frequency-Division Duplex (FDD). |
| SwitchingTimeInfo | DL/UL switching time information. Including only in case of operating in Time-Division Duplex (TDD). |
| RACH-preambleInfo | Preamble information necessary for random accessing BS transmitting system information. |
| SIBx_transmission_subframe_set_conf | Configuration information including period of transmission of subframe set, burst duration information, i.e., duty cycle of burst duration, information on whether current SIBx is $n^{th}$ subframe among subframe set (or among burst duration) or timing information at which next subframe set will be transmitted, SIBx contents change identifying counter, etc. |

| Parameter | Content |
| --- | --- |
| tracking area code | Code of tracking area to which BS transmitting system information belongs. The tracking area means a bundle of BSs used for call of MS. |

4. The method of claim 3, wherein the subframes included in the subframe set are transmitted at an operation frequency band of an upper BS of the femto BS.

5. The method of claim 4, wherein the system information has the same structure as the MIB, and is CRC-processed using a Cyclic Redundancy Check (CRC) mask representing the system information.

6. The method of claim 4, wherein the subframes comprised in the subframe set are transmitted through a system information transmission duration assigned by the upper BS or an upper network element.

7. The method of claim 1, wherein the subframes comprised in the subframe set each comprise a control channel at a start portion of the subframe.

8. The method of claim 1, wherein the system information comprises a System Information Block (SIB) for the femto BS, and the MIB comprises system information for an upper BS.

9. An operation method of a Base Station (BS) in a wireless communication system, the method comprising:
    configuring a subframe set comprising at least two types of subframes among subframes having predefined different structures; and
    transmitting one of each of the subframes comprised in the subframe set according to predefined order in every five subframes, wherein no subframe is transmitted in a period other than the every five subframes, a duration of the every five subframes being discontinuously distributed in a frame,
    wherein the subframes having the predefined different structures comprise:
        a first type subframe comprising a synchronization signal and a Master Information Block (MIB);
        a second type subframe comprising the synchronization signal;
        a third type subframe comprising the synchronization signal, the MIB, and reference signals;
        a fourth type subframe comprising the synchronization signal and the reference signals; and
        a fifth type subframe comprising system information, and
    wherein the subframe set is transmitted during preset burst duration every preset system information transmission period, and the system information transmission period and the burst duration are defined in a unit of frame.

10. The method of claim 9, wherein the subframe set comprises a single first type subframe and a single second type subframe, and
    wherein the transmitting of one of the subframes comprised in the subframe set according to the predefined order comprises alternately transmitting the first type subframe and the second type subframe in every five subframes.

11. The method of claim 10, wherein the subframe set comprising the single first type subframe and the single second type subframe is used in one of a case where no MS has access to the BS and a case where at least one MS does not perform communication although being in access to the BS.

12. The method of claim 11, further comprising transmitting system information through one of the first type subframe and the second type subframe.

13. The method of claim 11, further comprising transmitting the fifth type subframe according to a period independent of a period of transmission of the subframe set.

14. The method of claim 11, further comprising:
    periodically transmitting system information through one of the first type subframe and the second type subframe; and
    transmitting the fifth type subframe according to a period independent of a period of transmission of the subframe set.

15. The method of claim 9, wherein the subframe set comprises a single third type subframe and a single fourth type subframe, and
    wherein the transmitting of one of the subframes comprised in the subframe set according to the predefined order comprises alternately transmitting the third type subframe and the fourth type subframe over in every five subframes.

16. The method of claim 15, wherein the subframe set comprising the single third type subframe and the single fourth type subframe is used in one of a case where no MS has access to the BS and a case where at least one MS does not perform communication although being in access to the BS.

17. A femto Base Station (BS) apparatus in a wireless communication system supporting a femtocell, the apparatus comprising:
    a controller configured to configure a subframe set comprising at least two types of subframes among subframes having predefined different structures; and
    a transmitter configured to, if a duration of a subframe carrying the subframe set arrives, transmit one of the subframe s comprised in the subframe set according to predefined order, wherein the duration is discontinuously distributed in a frame and no subframe is transmitted in a period other than the duration,
    wherein the subframes having the predefined different structures comprise:
        a first type subframe comprising a synchronization signal and a Master Information Block (MIB);
        a second type subframe comprising the synchronization signal;
        a third type subframe comprising the synchronization signal and system information;
        a fourth type subframe comprising the synchronization signal, the MIB, and the system information; and
        a fifth type subframe comprising the system information, and
    wherein the synchronization signal included in the subframe set is the same, in a physical layer structure, as a synchronization signal transmitted through an operation frequency band of a femtocell BS, and
    wherein the controller is configured to transmit the subframe set during a preset burst duration every preset system information transmission period, and the system information transmission period and the burst duration are defined in a unit of frame.

18. The apparatus of claim 17, wherein the duration of a subframe carrying the subframe set arrives over a period of duration of five subframes.

19. The apparatus of claim 18, wherein the system information comprises at least one of a plurality of parameters shown in a Table:

| Parameter | Content |
| --- | --- |
| plmn-IdntitList | PLMN (Public Land Mobile Network) identity list. The PLMN means one mobile communication service provider. |
| Cell Identity | Identity on cell of BS |
| CSG Idication | Indication representing if cell of BS transmitting system information is cell applying CSG (Closed Subscriber Group). |
| CSG Identity | Identity representing CSG mode. The CSG mode comprises at least one of open mode, close mode, and hybrid mode. |
| RAT-indicator | Identity indicating Radio Access Technology (RAT) of BS transmitting system information. |
| hybrid-access-mode indicator | Identity indicating hybrid access mode of BS transmitting system information. |
| TDD-indicator | Identity distinguishing duplex schemes of BS transmitting system information. |
| dl-CarrierFreqInfo | DL operation frequency information of BS transmitting system information. |
| Low-duty-mode-Indicator | Identity representing current operation mode of BS transmitting system information. The operation mode is distinguished into first mode generally operating and second mode discontinuing partial function for power control. |
| ul-CarrierFreqInfo | UL operation frequency information of BS transmitting system information. Including only in case of operating in Frequency-Division Duplex (FDD). |
| SwitchingTimeInfo | DL/UL switching time information. Including only in case of operating in Time-Division Duplex (TDD). |
| RACH-preambleInfo | Preamble information necessary for random accessing BS transmitting system information. |
| SIBx_transmission_subframe_set_conf | Configuration information including period of transmission of subframe set, burst duration information, i.e., duty cycle of burst duration, information on whether current SIBx is $n^{th}$ subframe among subframe set (or among burst duration) or timing information at which next subframe set will be transmitted, SIBx contents change identifying counter, etc. |
| tracking area code | Code of tracking area to which BS transmitting system information belongs. The tracking area means a bundle of BSs used for call of MS. |

20. The apparatus of claim 19, wherein the subframes included in the subframe set are transmitted at an operation frequency band of an upper BS of the femto BS.

21. The apparatus of claim 20, wherein the system information has the same structure as the MIB, and is CRC-processed using a Cyclic Redundancy Check (CRC) mask representing the system information.

22. The apparatus of claim 17, wherein the subframes comprised in the subframe set are transmitted through a system information transmission duration assigned by the upper BS.

23. The apparatus of claim 17, wherein the subframes comprised in the subframe set each comprise a control channel at a start portion of the subframe.

24. The apparatus of claim 17, wherein the system information comprises a System Information Block (SIB) for the femto BS, and wherein the MIB comprises system information for an upper BS.

25. A Base Station (BS) apparatus in a wireless communication system, the apparatus comprising:
a controller configured to configure a subframe set comprising at least two types of subframes among subframes having predefined different structures; and
a transmitter configured to transmit one of each of the subframes comprised in the subframe set according to predefined order in every five subframes, wherein no subframe is transmitted in a period other than the every five subframes, a duration of the every five subframes being discontinuously distributed in a frame,
wherein the subframes having the predefined different structures comprise:
a first type subframe comprising a synchronization signal and a Master Information Block (MIB);
a second type subframe comprising the synchronization signal;
a third type subframe comprising the synchronization signal, the MIB, and reference signals;
a fourth type subframe comprising the synchronization signal and the reference signals; and
a fifth type subframe comprising system information, and
wherein the subframe set is transmitted during preset burst duration every preset system information transmission period, and the system information transmission period and the burst duration are defined in a unit of frame.

26. The apparatus of claim 25, wherein the subframe set comprises a single first type subframe and a single second type subframe, and
wherein the controller is configured to alternately transmit the first type subframe and the second type subframe in every five subframes.

27. The apparatus of claim 26, wherein the subframe set comprising the single first type subframe and the single second type subframe is used in one of a case where no MS has access to the BS and a case where at least one MS does not perform communication although being in access to the BS.

28. The apparatus of claim 25, wherein the subframe set comprises a single third type subframe and a single fourth type subframe, and wherein the controller is configured to alternately transmit the third type subframe and the fourth type subframe in every five subframes.

29. The apparatus of claim 28, wherein the subframe set comprising the single third type subframe and the single fourth type subframe is used in one of a case where no MS has access to the BS and a case where at least one MS does not perform communication although being in access to the BS.

* * * * *